United States Patent
Baker et al.

(10) Patent No.: US 6,785,610 B2
(45) Date of Patent: Aug. 31, 2004

(54) SPATIAL AVOIDANCE METHOD AND APPARATUS

(75) Inventors: Brian C. Baker, Arlington, TX (US); Scott J. Paynter, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/168,700

(22) PCT Filed: Dec. 15, 2000

(86) PCT No.: PCT/US00/33871

§ 371 (c)(1),
(2), (4) Date: Jun. 20, 2002

(87) PCT Pub. No.: WO01/46766

PCT Pub. Date: Jun. 28, 2001

(65) Prior Publication Data

US 2003/0014165 A1 Jan. 16, 2003

Related U.S. Application Data

(60) Provisional application No. 60/171,314, filed on Dec. 21, 1999.

(51) Int. Cl.[7] ............................ G06F 15/50; G08G 5/04; G01S 13/93
(52) U.S. Cl. ........................ 701/301; 701/120; 340/961
(58) Field of Search ........................... 701/14, 25, 301, 701/96, 117, 120, 300, 302, 207; 340/961, 970, 436, 903, 945, 973; 342/65, 70, 29, 455, 30, 36

(56) References Cited

U.S. PATENT DOCUMENTS

| | | | |
|---|---|---|---|
| 5,006,988 A | | 4/1991 | Borenstein et al. ..... 364/424.02 |
| 5,043,903 A | | 8/1991 | Constant ...................... 364/460 |
| 5,545,960 A | | 8/1996 | Ishikawa ..................... 318/587 |
| 5,758,298 A | | 5/1998 | Guldner ........................ 701/23 |
| 5,838,262 A | * | 11/1998 | Kershner et al. ........... 340/945 |
| 5,913,919 A | * | 6/1999 | Bauer et al. ................ 701/301 |
| 6,133,867 A | * | 10/2000 | Eberwine et al. ............. 342/29 |
| 6,134,502 A | * | 10/2000 | Sarangapani ................ 701/301 |
| 6,157,892 A | * | 12/2000 | Hada et al. .................. 701/301 |
| 6,246,949 B1 | * | 6/2001 | Shirai et al. ................... 701/96 |
| 6,538,581 B2 | * | 3/2003 | Cowie ......................... 340/961 |

* cited by examiner

Primary Examiner—Tan Q. Nguyen
Assistant Examiner—Dalena Tran
(74) Attorney, Agent, or Firm—Sidley Austin Brown & Wood LLP; Stephen S. Sadacca

(57) ABSTRACT

An obstacle avoidance system, apparatus, and method is described suitable for use on autonomously guided or man-in-the-loop guided vehicles such as aircraft, missiles, cars, and other types of vehicles. The system provides guidance instructions in the situation where the vehicle encounters an obstacle either directly or indirectly in its path while traveling to a desired destination or where vehicles are traveling in formation. The system can be applied not only to obstacle avoidance but also to trajectory shaping by defining obstacles, operational boundaries and/or threats which influence the trajectory of the vehicle.

65 Claims, 22 Drawing Sheets

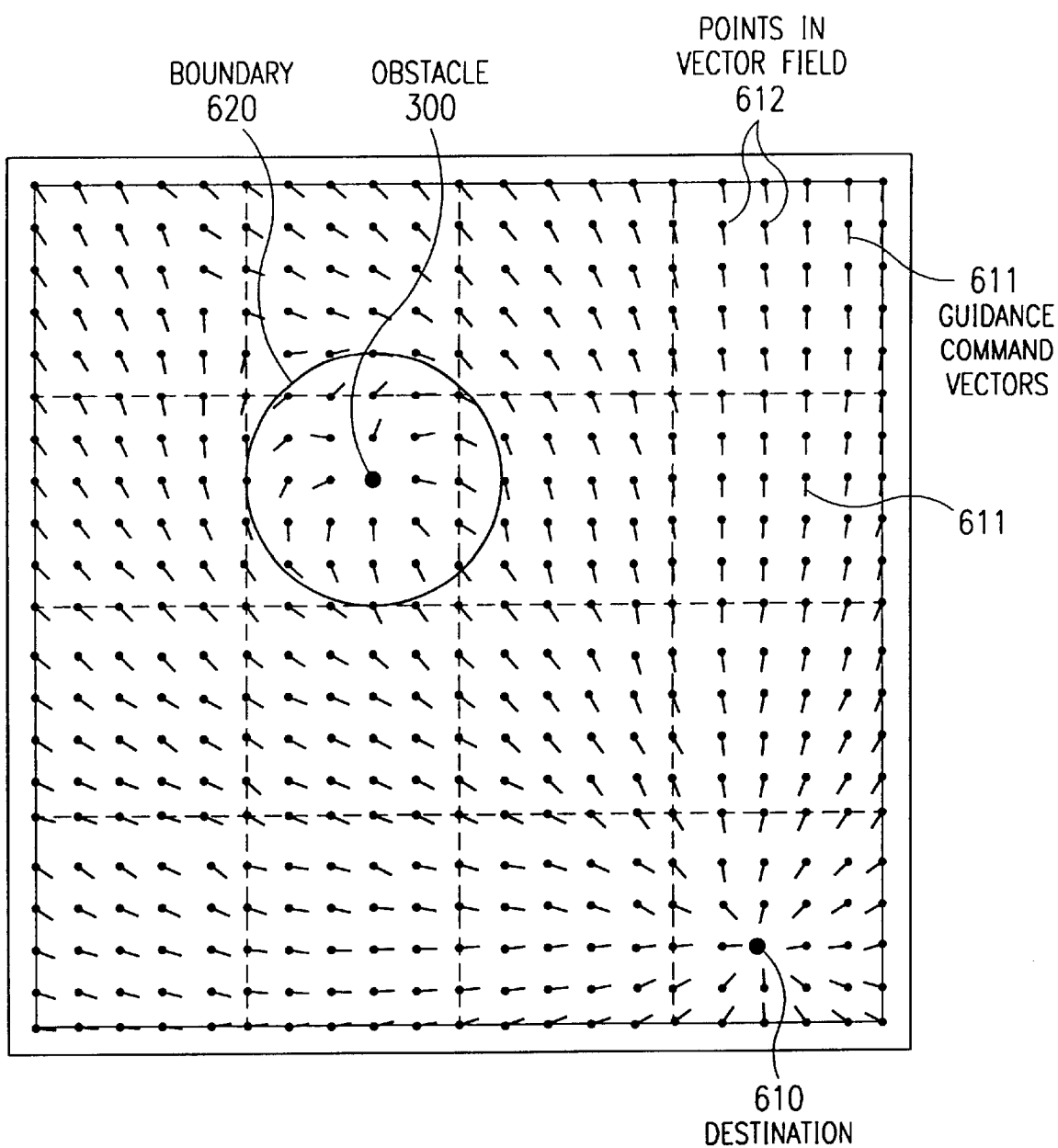

SPATIAL AVOIDANCE METHOD AND APPARATUS

RELATED APPLICATIONS

This application claims the benefit of U.S. Provisional Patent Application Ser. No. 60/171,314, filed on Dec. 21, 1999, the entire contents of which are hereby incorporated by reference.

FIELD OF THE INVENTION

The present invention relates to a guidance method and system suitable for use with autonomously guided and man-in-the-loop guided vehicles where the presence of obstacles and/or threats must be considered in guiding the vehicle to a destination.

BACKGROUND OF THE INVENTION

During the travel of an autonomously guided or man-in-the-loop guided vehicle towards a destination, there may be obstacles, impediments and/or threats present in the path of travel which must be avoided which otherwise would prevent the vehicle from reaching its destination or would cause damage to the vehicle. Various guidance augmentation concepts have been suggested for avoiding obstacles, operational boundaries, and/or threats. Generally, these concepts have been developed with the approach such that if no impediments are present, then the travel of the guided vehicle is not changed. However, if impediments are present, these concepts provide the guidance system with directions diverting the vehicle around the impediment to allow the vehicle to proceed to the desired destination.

These avoidance methods have been used, for instance, in the field of tactical missiles. There, during the launch, flight, and intercept phases of flight, there are numerous constraints on the guidance system that result from obstacles or operational limitations that must be accommodated in addition to the requirement that the missile be guided so as to hit the target. Some of these constraints include maneuverability constraints based on dynamic, kinematic, and/or mechanical constraints of the vehicle; operational envelope constraints such as maximum altitude or minimum altitude limitations on the vehicle; obstacle constraints, such as friendly airborne assets; and, threat constraints such as enemy assets which may target the vehicle in an attempt to destroy the vehicle. All of these factors are significant considerations in shaping the trajectory of the missile during its flight. Various textbook guidance methods that have been proposed will be briefly discussed below. These methods, however, do not take into account all of those constraints and therefore would benefit from augmentation in some form prior to implementation in a real world application.

A first known method for accommodating guidance constraints is known as a waypoint method. This guidance method uses waypoints or intermediate points along a trajectory. One such concept is described in the article "Obstacle-Avoidance Automatic Guidance: A Concept Development Study" by Victor H. L. Cheng, published in *AIAA Journal*, Paper Number 88-4189-CP, 1988. The basic idea behind the waypoint concept is that if an obstacle, operational boundary, or threat is perceived, a set of waypoints is constructed such that an avoidance path can be achieved. This concept is illustrated in FIG. 1. As shown in FIG. 1, a vehicle 10 can be navigated from a starting point 110 to a destination 140 via waypoints 120 and 130. To generate an efficient trajectory, the waypoints must be selected carefully. The waypoint method is suitable for applications where the impediments are stationary and are not dynamic.

Another known avoidance method is to use optimal guidance strategies to steer a vehicle around obstacles or boundaries. One such approach is described in the article "Control Theoretic Approach to Air Traffic Conflict Resolution", *AIAA Journal*, Paper Number 93-3832-CP, 1993. This method involves the definition of a cost function that measures the quality or goodness of a particular trajectory and which optimizes the cost function over a set of possible trajectories. The construction of the cost function is generally based on the dynamics or relative motion of the obstacles, operational boundaries, and/or threats to the missile. Generally, this method must be solved numerically and can require large amounts of real time processing to solve. Also, the addition of multiple obstacles, operational boundaries, and/or dynamic threats in the operation or flight significantly increases the complexity of the cost function and thus further increases processing requirements.

Another avoidance method relies upon mathematical representations of potential fields. In this approach, sources, which are potential field elements that provide a mathematically repelling force, can be used individually or as a surface to provide a range dependent force in order to push the missile guidance away from the obstacle. Sources have a unique quality in that the amount of repelling force is inversely proportional to the distance from the source. For example, a missile that is close to a source will be pushed away with greater force than a missile that is far from the source. Because of this range dependent characteristic, and because sources are computationally efficient to use, sources can be used in a large number of avoidance applications. However, source methods have a drawback that, if they are not modified, they will affect the guidance commands by directing the vehicle away from the obstacle throughout the trajectory of the vehicle because the source has an infinite range of influence.

A modification to the source approach adds a range boundary beyond which the source will not affect the vehicle. One such approach is described in "Generation of Conflict Resolution Maneuvers for Air Traffic Management", by Claire, et al., *IEEE Journal*, Paper No. 0/7803-4119-8, 1997. In this approach, the method will push the guidance command away from the obstacle only when the missile is inside the range boundary and will not affect the vehicle when it is outside the boundary. One drawback to this method is that the guidance command is mathematically discontinuous across the boundary. Discontinuous commands are undesirable because they can cause instabilities in the guidance solution in the circumstance when multiple obstacles, boundaries, or threats are encountered. Another drawback to this method is in regard to threat avoidance. Specifically, this method will tend to direct a vehicle along the direction of the velocity of the threat in order to avoid the threat. However, if the threat has sufficient velocity to overtake the vehicle and the source potential is located on the vehicle, the threat can nevertheless have a successful intercept. The Claire, et al. article also mentions the use of vortex potential field elements in the construction of an avoidance solution. Vortex elements are essentially planar rotation elements that push the field in a rotational direction about a point. Vortex elements are not easily adapted to multi-dimensional spaces above two dimensions, because they are two-dimensional elements. To apply a vortex element in a three-dimensional space would require knowledge of the direction which the vortex would act about. In a dynamic situation, the addition of a vortex element would limit the number of evasive solutions and would hinder the performance of an avoidance algorithm. Nevertheless, two-dimensional applications of vortex elements can be appropriate in circumstances such as traffic management applications where the flow of vehicles conforms to pre-established guidelines.

Another known avoidance method employs specific geometric boundary shapes to describe how an avoidance maneuver is to be performed. These geometric methods use the surface tangents from the geometric boundary to provide a direction of avoidance for the avoidance maneuver. One such avoidance approach is described in "A Self-Organizational Approach for Resolving Air Traffic Conflicts", pages 239–254, by Martin S. Eby, published in *The Lincoln Laboratory Journal*, Volume 7, No. 2, 1994. Such an approach is illustrated in FIG. 2, where a vehicle 10 is traveling in direction of arrow D and must avoid obstacle plane 200. A geometric boundary shape 210 is defined around obstacle plane 200 at a radius $r_D$ which is the desired miss distance. In the case where the path of the subject plane 10 to its destination 220 intersects the geometric boundary shape 210, an avoidance maneuver is necessary. In this circumstance, an avoidance velocity vector solution $V_S$ is found, in part, by forming a tangent 230 to the geometric boundary 210. A significant limitation to this method with regard to tactical missiles is that if the missile gets inside of the avoidance geometric boundary, then the tangent vector to the surface no longer exists. The Claire, et al. article also discusses how the size of the geometric boundary shape can be reduced in order to allow for calculation of a tangent. Specifically, in the case where the missile gets inside of the avoidance geometric boundary, the geometric boundary shape is reduced until the missile is returned to the exterior of the geometric boundary. The reduction of the size of the geometric boundary can work for obstacle avoidance because as a subject vehicle approaches the surface geometry, the guidance direction becomes more aggressive in an avoidance direction.

One shortcoming of the method occurs when trying to provide an operational boundary such as a maximum altitude for a vehicle. One representation of an absolute altitude ceiling is a single sphere which surrounds the earth at a specified altitude. Such a sphere, however, would immediately cause a problem with the above-described method because the vehicle would always be inside the geometric boundary and thus no tangent could be formed. Such a method would also have difficulty with an altitude ceiling limitation if a maximum altitude were represented by a plane. In this case, the geometric tangent method would provide an avoidance command that was always parallel to the plane. As a result, the desired avoidance command would be ignored at all times.

The tangent geometric boundary avoidance technique is also inadequate in the circumstance of launching a missile from an aircraft. Specifically, the tangent method cannot accommodate the situation where the missile is inside the geometric shape which surrounds the vehicle to be avoided. Thus, the geometric shape must be made very small. However, if the geometric shape surrounding a launching aircraft is made small enough to allow the tangent method to work, the geometric shape would be smaller than the aircraft to be avoided, no avoidance commands would be issued, and the missile would be able to fly into the launching aircraft.

Accordingly, in view of the above, what is needed is an improved avoidance system and method which can address the shortcomings outlined above.

SUMMARY OF THE INVENTION

An object of the present invention is to provide an avoidance system and method which addresses both static and dynamic obstacles and which does not require specialized algorithms for dynamic obstacles.

Another object of the present invention is to provide an obstacle avoidance system and method which provide a deterministic avoidance command and which does not require an iterative minimization algorithm for a solution.

A further object of the present invention is an avoidance system and method which comprehends the situation where the vehicle is inside of a geometric boundary shape.

According to the present invention, the foregoing objects are attained by blending together a distance-based field element (such as source, sink, or vortex), a geometric boundary surface normal and tangent, an original guidance command, and the distance to the obstacle to produce an avoidance command that will direct the missile away from the obstacle and proceed in the general direction of the target destination.

The avoidance commands are constructed in a fashion such that, in the case where a vehicle is very close to an obstacle, the avoidance command directs the vehicle in a direction to prevent collision. When a vehicle approaches a geometric boundary, the avoidance command is blended from an anti-intercept direction to a direction that is a function of a surface tangent, such that the avoidance command is continuous across the geometric boundary. Outside the geometric boundary, the guidance command is blended with a vector that is a function of the surface tangent taken in a distance dependent fashion to provide an avoidance direction along the desired direction of travel. As a result, the inclusion of obstacles and/or threats in the operational space of a vehicle will produce an alteration to the nominal guidance commands yet still allow the vehicle to travel to its intended final destination or final state. In the absence of obstacles, operational boundaries or threats, the present invention will not alter the original guidance commands and the vehicle will travel according to the original guidance implementation.

This invention may be applied in applications such as autonomous vehicles as well as vehicles employing man-in-the-loop guidance. Specifically, such as in the situation of a flight director, an operator of the vehicle may be informed of a proper guidance adjustment required to avoid an obstacle.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers.

FIG. 11 is a vector field diagram representing a situation where only one obstacle is present;

DETAILED DESCRIPTION OF THE PREFERRED EMBODIMENTS

Preferred Embodiments of the present invention will now be described in detail in reference to the various drawings.

As noted above, an avoidance method and system in accordance with the present invention combine the ability to avoid obstacles while allowing the vehicle to proceed to a final desired destination. In the case of a tactical missile, the primary mission of the missile is to fly to a target destination, which may be in motion or at rest, and to deliver at the destination a payload. Along the trajectory, the missile may encounter obstacles or impediments, which may be in the form of friendly airborne assets, operational boundaries which may define altitude ceilings and floors, and threats, which may try to intercept the missile during its mission. The objective of the avoidance method and system is to provide a guidance command or direction ($e_{avoid}$) which can direct the missile so as to avoid the obstacles and still permit the vehicle to reach the intended target destination.

In order to operate, the present method and system require information about the state of each obstacle. Such information may include the obstacle's position, velocity and heading, acceleration, or some other quantity which can be used in the avoidance method computation. The method is not dependent on how the information is obtained, however, the effectiveness of the resulting obstacle avoidance commands which result from the present method will be influenced by the accuracy of the state information provided with regard to the obstacle(s).

First Embodiment

Obstacle Avoidance

A First Embodiment of the present invention is described in regard to an implementation where an obstacle is contained inside a geometric boundary.

Vehicle Outside a Geometric Boundary of the Object

Figure 1:
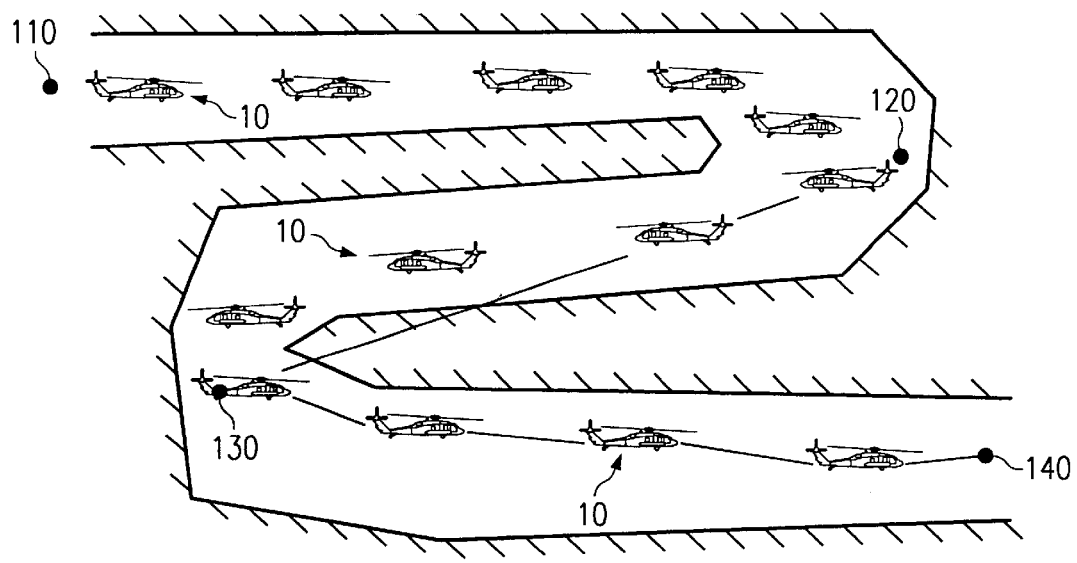
FIG. 1 shows an example of a vehicle being maneuvered along a flight path by the method of waypoints as known in the prior art.
Figure 2:
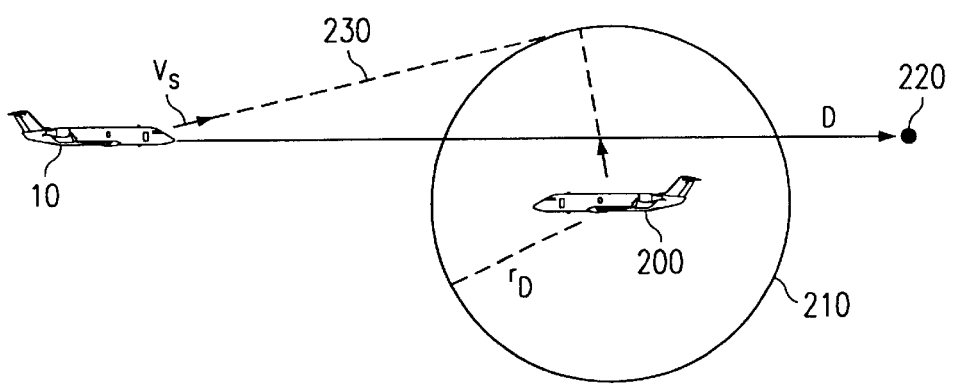
FIG. 2 shows a geometric boundary avoidance method of the prior art.
Figure 3A:
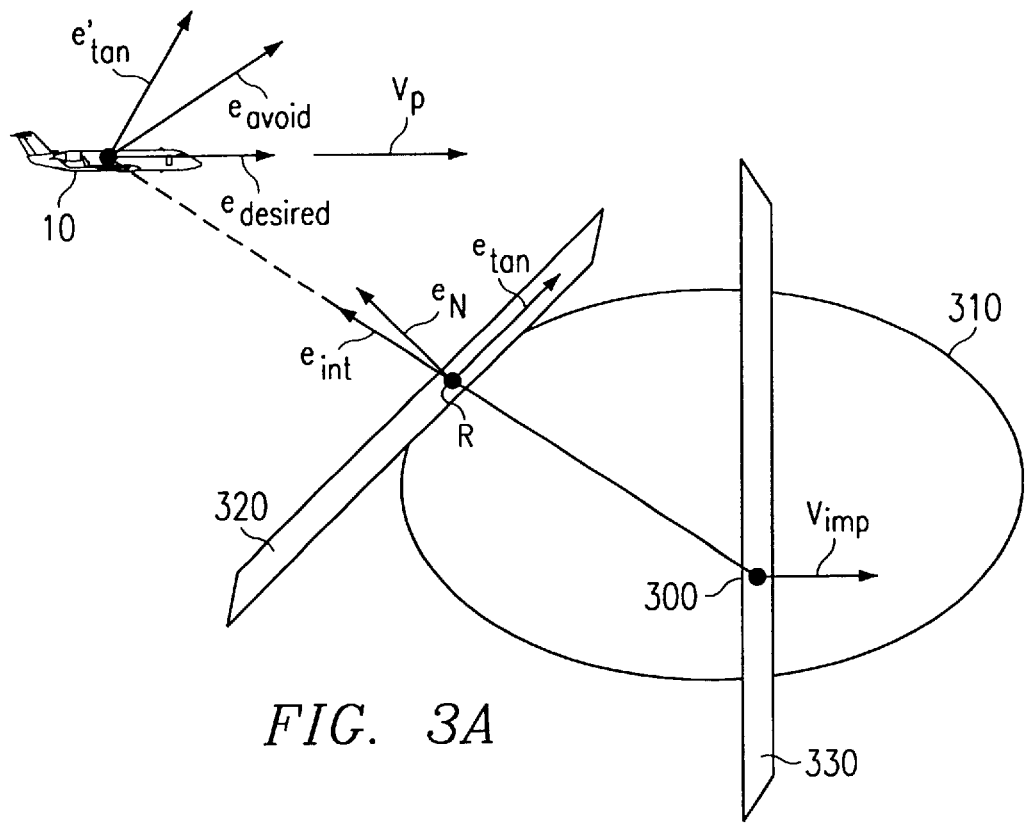
FIG. 3A shows a first embodiment where an avoidance command is determined in a case where the object is contained inside a geometric boundary and where the vehicle is outside the geometric boundary.

A First Embodiment of the present invention involves implementation of the obstacle avoidance method computation where the vehicle to be maneuvered to avoid the obstacle is outside a geometric boundary of the obstacle as shown in FIG. 3A. The geometric boundary includes the position of the obstacle and a region surrounding the obstacle. FIG. 3A generally illustrates the situation where a vehicle 10 is approaching an object to be avoided 300, where the object to be avoided 300 is contained inside a geometric boundary 310 and where the vehicle 10 is outside the geometric boundary 310. Various guidance vectors "e" are shown in FIG. 3A, and will be individually described in more specific detail below.

It should be noted that in the following discussion, when the boundary defines an object or region to be avoided, the object and its surrounding region are referred to as a source element. When the boundary defines an object or region towards which the vehicle is attracted, the object or region is referred to as a sink element. For the purpose of understanding the present method, however, the repelling effect of a source or the attracting effect of a sink are different principally in the sign (i.e., + or −) of the forces and vectors involved. The fundamental principles described next are otherwise the same for sources and sinks.

As illustrated in FIG. 3A, vehicle 10 travels at velocity $V_p$ following a nominal guidance command $e_{desired}$ which represents the guidance command that vehicle 10 would be commanded to follow in the absence of any obstacle whose presence would cause a deviation. Obstacle 300 may be moving at a velocity $V_{imp}$. However, for purposes of discussion at this time, $V_{imp}$ is substantially zero. Vector $e_{int}$ represents a line of intercept between the obstacle 300 and the vehicle 10. Point R represents the point of intersection of vector $e_{int}$ on the surface of the geometric boundary 310. Plane 320 is a plane which is tangent to the geometric boundary 310 at point R, and point R is the surface point of tangency of plane 320. Vector $e_N$ is a surface normal vector at the surface point of tangency, R. Vector $e_{tan}$ is a vector representing a component of the nominal guidance command $e_{desired}$ projected onto tangent plane 320 and is the component in the direction of the nominal guidance command $e_{desired}$. As will be explained more fully below, plane 330 represents a transition zone between a state where the vehicle 10 is approaching the obstacle 300 and a state where the vehicle 10 has overtaken and is receding from the obstacle 300. Vector $e'_{tan}$ is the geometric based avoidance vector which is determined from $e_N$ and $e_{tan}$. Vector $e_{avoid}$ represents the resulting avoidance guidance command, the computation of which will be explained below in reference to FIG. 3B.

Figure 3B:
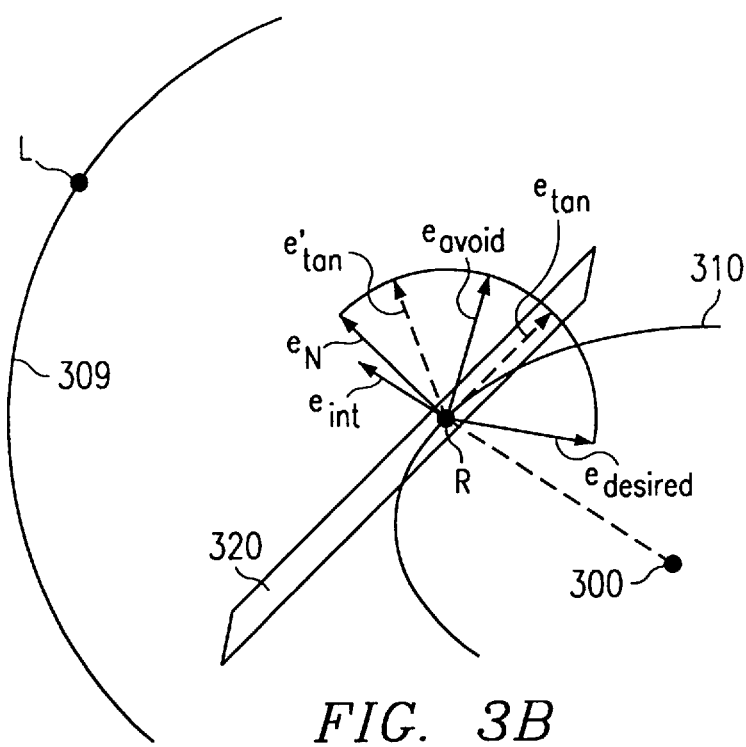
FIG. 3B shows a detailed view of the vector analysis used in a first embodiment where an avoidance command is determined in a case where the object is contained inside a geometric boundary and where the vehicle is outside of the geometric boundary.

FIG. 3B more specifically illustrates the applicable vectors used in determining the resulting avoidance guidance command $e_{avoid}$ in a situation similar to that shown in FIG. 3A, where an object to be avoided is contained inside a geometric boundary and the vehicle is outside the geometric boundary. For discussion purposes, all vectors in FIG. 3B are shown originating at R to demonstrate the relative relationship between the vectors.

As illustrated in FIG. 3B, a plane 320 tangent to a geometric surface of the geometric boundary 310 is defined having its point of tangency at point R, which is the intersection of the geometric surface of the geometric boundary with the vector $e_{int}$ defined by the relative position of a vehicle (not shown but positioned as if at R) to the obstacle 300. Vector $e_{tan}$ is a component of the nominal guidance command, $e_{desired}$, when $e_{desired}$ is projected onto plane 320 so that $e_{tan}$ is in the direction of the nominal guidance command.

As shown in equations (1a) and (1b), the surface normal $e_N$ and the tangent direction at the surface point of tangency $e_{tan}$ are then combined through the use of linear or non-linear functions $h_1(x)$ and $h_2(x)$ to provide a geometric-based avoidance vector $e'_{tan}$. This approach blends vector $e_N$ with vector $e_{tan}$ such that the geometric avoidance vector $e'_{tan}$ can range from $e_{tan}$ to $e_N$ depending on the value of functions $h_1(x)$ and $h_2(x)$. According to the First Embodiment, $$e'_{tan} = E'_{tan}/\|E'_{tan}\| \quad (1a)$$

where $$E'_{tan} = h_1(x)e_N + h_2(x)e_{tan} \quad (1b)$$

where $0 \leq h_1(x) \leq \infty$ and $0 \leq h_2(x) \leq \infty$, such that $h_1(x)$ and $h_2(x)$ are not both zero. For all equations of the form above, functions such as $h_1(x)$ and $h_2(x)$ should be constructed such that $\|E'_{tan}\| \neq 0$.

One particular example of functions $h_1(x)$ and $h_2(x)$ which satisfies the above criteria is where $h_2(x)$ is defined as $1-h_1(x)$, where $0 \leq h_1(x) \leq 1$. However, in the obstacle avoidance method of the present invention, functions $h_1(x)$ and $h_2(x)$ need not be related. Any other avoidance functions may alternately be used in the computation so long as they satisfy the above requirements.

Referring to FIGS. 3A and 3B, after geometric avoidance vector $e'_{tan}$ is determined, the resulting avoidance guidance command $e_{avoid}$ is determined, as shown in equations (2a) and (2b), by blending together $e'_{tan}$ with $e_{desired}$, based on functions $f_1(x)$ and $f_2(x)$, such that $e_{avoid}$ can range from $e_{desired}$ to $e'_{tan}$ depending on the value of functions $f_1(x)$ and $f_2(x)$. According to the First Embodiment, $$e_{avoid} = E_{avoid}/\|E_{avoid}\| \quad (2a)$$

where $$E_{avoid} = f_1(x)e_{desired} + f_2(x)e'_{tan} \quad (2b)$$

where $0 \leq f_1(x) \leq \infty$ and $0 \leq f_2(x) \leq \infty$, such that $f_1(x)$ and $f_2(x)$ are not both zero; and where $f_2(x)=0$, when the vehicle is at or beyond point L, point L being a point on the influence surface 309 located a distance from the obstacle 300 to be avoided along $e_{int}$; and $f_1(x)=0$, when the vehicle 10 is at point R. Further, functions $f_1(x)$ and $f_2(x)$ should be constructed such that $\|E_{avoid}\| \neq 0$.

One particular example of functions $f_1(x)$ and $f_2(x)$ is where $f_2(x)$ is defined as $1-f_1(x)$, where $0 \leq f_1(x) \leq 1$. However, in the obstacle avoidance method of the present invention, functions $f_1(x)$ and $f_2(x)$ need not be related. Other avoidance functions may alternately be used in the computation.

As noted above for FIG. 3A, plane 330 represents a transition zone for changing the avoidance command as the vehicle 10 overtakes and passes the obstacle 300. More specifically, when the vehicle is outside the geometric boundary 310 of the obstacle 300, if the avoidance guidance command $e_{avoid}$, as described and determined above, is applied as the vehicle 10 overtakes and passes the obstacle 300, the guidance command generated will unnecessarily and undesirably follow the $e_{tan}$ vector after passing the obstacle 300.

Figure 3C:
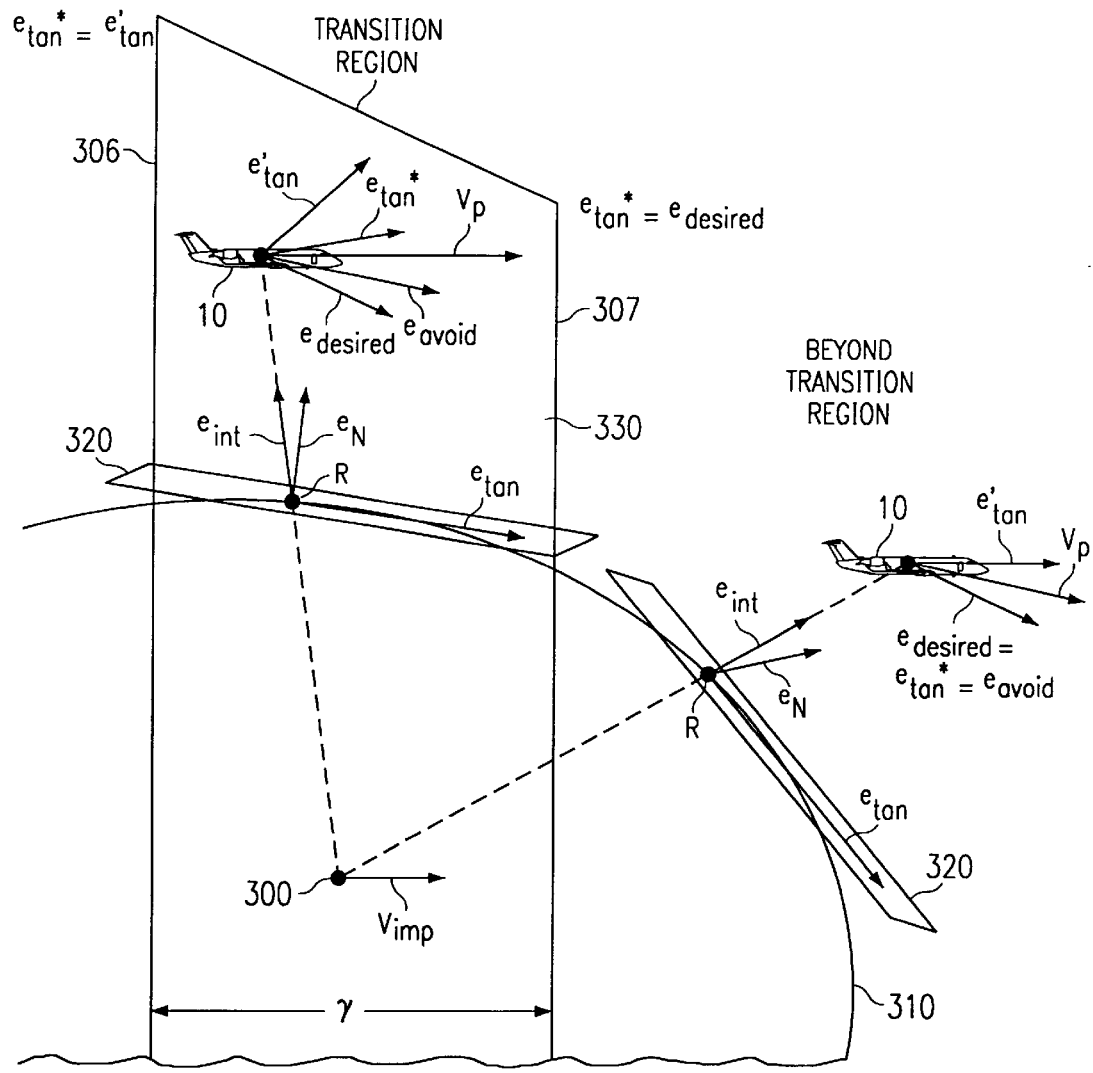
FIG. 3C shows a detailed view of the vector analysis used in a first embodiment where an avoidance command is determined in a case where the object is contained inside a geometric boundary and where the vehicle is outside of the geometric boundary and has passed the object.

Referring now to FIG. 3C, once the vehicle 10 has passed the obstacle 300, the $e'_{tan}$ vector can be blended with the $e_{desired}$ vector by using continuous linear or non-linear functions $g_1(x)$ and $g_2(x)$ to construct $e_{tan}*$. The vector $e_{tan}*$ is constructed based on $e'_{tan}$ and $e_{desired}$ through functions $g_1(x)$ and $g_2(x)$ so that $e_{tan}* \rightarrow e'_{tan}$ when the vehicle 10 is approaching the obstacle 300 and $e_{tan}* \rightarrow e_{desired}$ after the vehicle 10 passes the obstacle 300 while remaining outside the geometric boundary 310. Like functions, $h_1(x)$ and $h_2(x)$, functions $g_1(x)$ and $g_2(x)$ may be limited to operation over a specified range, γ.

Vector $e_{tan}*$ can be described in accordance with functions (3a), (3b) and as follows:

$$e_{tan}* = E_{tan}*/\|E_{tan}*\| \quad (3a)$$

where $$E_{tan}* = g_1(x)e_{desired} + g_2(x)e'_{tan} \quad (3b)$$

where $0 \leq g_1(x) \leq \infty$ and $0 \leq g_2(x) \leq \infty$, such that $g_1(x)$ and $g_2(x)$ are not both zero; and $g_2(x)=0$, when the vehicle 10 is at an end 306 of the transition range γ, and $g_1(x)=0$ when the vehicle 10 is at a beginning 307 of the transition range γ. Further, functions $g_1(x)$ and $g_2(x)$ should be constructed such that $\|E_{tan}\| \neq 0$.

In an exemplary embodiment, $g_1(x)=g_1(x, \gamma)$ and $g_2(x) = g_2(x, \gamma)$ where $g_2(x, \gamma)=1-g_1(x, \gamma)$ and where γ is a continuous multi-variable function which describes the spatial boundary over which the command will be transitioned from $e_{desired}$ to $e'_{tan}$.

Thus, in equations above, when functions $g_1(x)$ and $g_2(x)$ are used to modify the behavior of the avoidance command as the vehicle 10 passes the obstacle 300, $e_{tan}*$ may then be substituted into equation (2b) to yield equation (4b), shown below, which is a more robust solution for obtaining $e_{desired}$ and which addresses the desirable transition of the guidance command after the vehicle 10 passes the obstacle 300.

$$E_{avoid} = f_1(x) e_{desired} + f_2(x) e_{tan}* \quad (4b)$$

where $f_1(x)$ and $f_2(x)$ are as defined above in regard to equations (2a) and (2b), and where $e_{tan}*$ is determined as defined above in regard to equations (3a) and (3b).

As was discussed above in previous computations of the method, $e_{avoid}$ is computed by the following equation:

$$e_{avoid} = E_{avoid}/\|E_{avoid}\| \quad (4a)$$

It will be appreciated by those skilled in the art that all functions described herein may be either linear or non-linear continuous functions. Also, for simplicity, the parameter, x, is used as the variable parameter of all functions throughout the discussion of the obstacle avoidance method computation. The variable "x" may represent a parameterized constant or set of constants, varying function, or family of functions. For example only and not by way of limitation, "x" may represent position, distance, time, angle, and/or acceleration. It will be appreciated by those skilled in the art that "x" may represent multiple functions or a multi-variable function, e.g. d(x) may instead be d(a, b) or d(a, b, γ). It will further be appreciated by those skilled in the art that "x" need not represent the same parameter or set of parameters in every function of an equation, nor need it represent identical variables in functions of different equations of the obstacle avoidance method computation.

Both Vehicle and Object are Inside a Geometric Boundary

The situation discussed above relative to FIGS. 3A, 3B and 3C addresses the situation where the object to be avoided 300 is contained inside of a geometric boundary 310 and where the approaching or retreating vehicle 10 is outside the geometric boundary 310. As will be discussed next with regard to FIG. 4, the First Embodiment of the present invention can also easily address the situation where both the vehicle 10 and the object to be avoided 300 are inside of a geometric boundary 310

Figure 4:
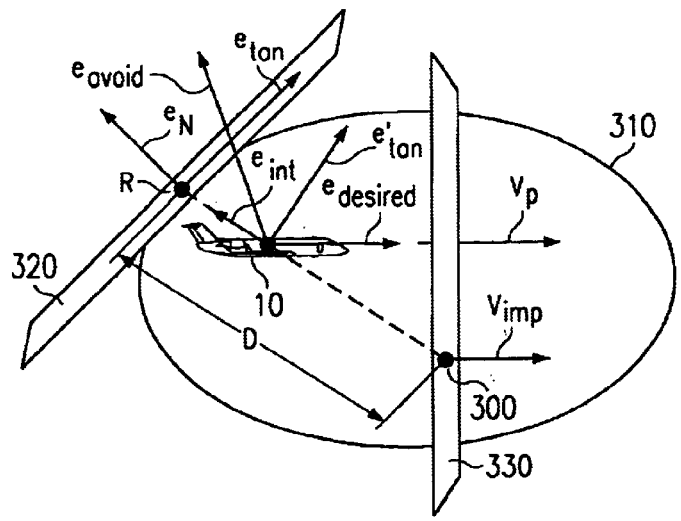
FIG. 4 shows a first embodiment where an avoidance command is determined in the case where the object is contained inside a geometric boundary and where the vehicle is also inside the geometric boundary.

FIG. 4 generally illustrates the situation where a vehicle 10 is approaching an object to be avoided 300, where both the object to be avoided 300 and the vehicle 10 are contained inside the geometric spatial boundary 310. Various guidance vectors "e" shown in FIG. 4 generally correspond to the guidance vectors shown in FIGS. 3A and 3B and will be more specifically described below.

Vehicle 10 travels at velocity $V_p$ following a nominal guidance command $e_{desired}$ which represents the guidance command that vehicle 10 would be commanded to follow in the absence of any obstacle whose presence would cause a deviation. Vector $V_{imp}$ represents the velocity of the obstacle 300 and is considered for illustrative purposes only to be zero. Vector $e_{int}$ represents a line of intercept between the vehicle 10 and the obstacle 300. Point R represents the point of intersection of vector $e_{int}$ on the surface of the geometric boundary 310. Plane 320 is a plane which is tangent to the geometric boundary 310 at the surface point of tangency R. Vector $e_N$ is a surface normal vector at the surface point of tangency R. Vector $e_{tan}$ is a vector representing the projection of the nominal guidance command $e_{desired}$ onto tangent plane 320 and is in the direction of the nominal guidance command $e_{desired}$. As shown in FIGS. 3A and 4, plane 330 represents a transition zone between a state where the vehicle 10 is approaching the obstacle 300 and a state where the vehicle 10 has overtaken and is receding from the obstacle 300. Vector $e'_{tan}$ is the geometric based avoidance vector which is determined from $e_N$ and $e_{tan}$. Vector $e_{avoid}$ represents the resulting avoidance guidance command, the computation of which will be explained below.

In the case where the vehicle 10 is inside the geometric boundary 310 (FIG. 4), as with the case where the vehicle 10 is outside the geometric boundary surface 310 (FIG. 3A), a geometric-based avoidance vector $e'_{tan}$ is determined in accordance with equations (1a) and (1b) by blending the surface normal $e_N$ and the tangent direction at the surface point of tangency $e_{tan}$ through the use of the functions $h_1(x)$ and $h_2(x)$. As noted above, this approach blends vector $e_N$ with vector $e_{tan}$ such that the geometric avoidance vector $e'_{tan}$ can range from $e_{tan}$ to $e_N$ depending on the value of functions $h_1(x)$ and $h_2(x)$. To avoid discontinuity in the calculation at the surface of the geometric boundary for the case where the vehicle 10 is inside the geometric boundary 310, it is preferable that $h_1(x)$ and $h_2(x)$ be the same functions as $h_1(x)$ and $h_2(x)$ in the case where the vehicle 10 is outside the geometric boundary 310. If the discontinuity is large enough, it may produce an unstable guidance mode whereby the guidance command will oscillate about a surface of the geometric boundary 310 and not produce the desired avoidance effect.

After the geometric avoidance vector $e'_{tan}$ is determined, the resulting avoidance guidance command $e_{avoid}$ is determined. Unlike the approach shown in equations (2a) and (2b), which are applied in the situation where the vehicle 10 is outside the geometric boundary 310, in the case where the vehicle 10 is inside of the geometric boundary 310, $e_{avoid}$ is determined based on $e'_{tan}$ and $e_{int}$. More specifically, as shown in equations (5a) and (5b), $e_{avoid}$ is determined by blending together $e'_{tan}$ with $e_{int}$, based on functions $f'_1(x)$ and $f'_2(x)$, such that $e_{avoid}$ can range from $e_{int}$ to $e'_{tan}$ depending on the value of the functions $f'_1(x)$ and $f'_2(x)$. In this situation, $$e_{avoid} = E_{avoid}/\|E_{avoid}\| \quad (5a)$$

where $$E_{avoid} = f'_1(x) e_{int} + f'_2(x) e'_{tan} \quad (5b)$$

where $0 \leq f'_1(x) \leq \infty$, $0 \leq f'_2(x) \leq \infty$, such that $f'_1(x)$ and $f'_2(x)$ are not both zero; $f'_2(x)=0$, when the vehicle 10 is coincident with a surface of the obstacle 300, and where $f'_1(x)=0$, when the vehicle 10 is at point R. As with the previous example, both $f'_1(x)$ and $f'_2(x)$ are linear or non-linear continuous functions with x being a parameterized constant, function, or family of functions used in the description of functions $f'_1(x)$ and $f'_2(x)$, where D is the local distance from the obstacle or point to be avoided 300 along $e_{int}$ to the geometric surface point of tangency R. Further, functions $f'_1(x)$ and $f'_2(x)$ should be constructed such that $\|E_{avoid}\| \neq 0$.

Although not shown, after vehicle 10, which is inside geometric boundary 310, passes obstacle 300, which is also inside geometric boundary 310, the guidance command can be modified in a manner similar to that of eqns. (3A) and (3B). Once the vehicle 10 has passed the obstacle 300, the $e'_{tan}$ vector can be blended with the $e_{desired}$ vector by continuous linear or non-linear functions $g_1(x)$ and $g_2(x)$ to construct $e_{tan}*$. The vector $e_{tan}*$ is constructed based on $e'_{tan}$ and $e_{desired}$ through function $g(x)$ so that $e_{tan}* \to e'_{tan}$ when the vehicle 10 is approaching the obstacle 300 and $e_{tan}* \to e_{desired}$ after the vehicle passes the obstacle, and where $e_{tan}*$ can be described in accordance with eqns. (3a) and (3b). Like functions $h_1(x)$ and $h_2(x)$, functions $g_1(x)$ and $g_2(x)$ may be limited to operation over a specified range, $\gamma$. As with the functions, $h_1(x)$ and $h_2(x)$, described above, it is preferable that functions $g_1(x)$ and $g_2(x)$ be the same as $g_1(x)$ and $g_2(x)$ for the case where the vehicle is outside the geometric boundary in order to avoid potential discontinuity at the geometric boundary surface.

When the functions $g_1(x)$ and $g_2(x)$ are used to modify the behavior of the avoidance command as the vehicle 10, inside the geometric boundary 310, passes the obstacle 300, $e_{tan}*$ may be substituted into equation (5b) to yield equations (6a) and (6b), shown below, which is a more robust solution for obtaining $e_{avoid}$ and which addresses the desirable transition of the guidance command after the vehicle 10 passes the obstacle 300. In the above situation:

$$e_{avoid} = E_{avoid}/\|E_{avoid}\| \quad (6a)$$

where $$E_{avoid} = f'_1(x)e_{desired} + f'_2(x)e_{tan}* \quad (6b)$$

where $f'_1(x)$ and $f'_2(x)$ are as defined above in regard to equations (5a) and (5b), and where $e_{tan}*$ is determined as defined above in regard to equations (3a) and (3b).

To reiterate, during application of the spatial avoidance method, as the vehicle 10 is approached by, or approaches an obstacle and is outside of the geometric boundary, the direction $e_{desired}$ will be modified based on a function of the tangent of the geometric boundary (eqns. 1a, 1b, 2a and 2b) and based on a function of the approaching or retreating obstacle state (eqns. 3a, 3b, 4a and 4b). Thus, at the boundary surface, the vehicle will be directed to fly tangent to the boundary and consequently fly around the obstacle along the edge of the boundary surface. When the vehicle has sufficiently avoided the obstacle, as determined by eqns. (3a) and (3b), the avoidance command is transitioned from an avoidance trajectory to the desired trajectory.

However, if the vehicle 10 penetrates the boundary, the direction $e_{desired}$ will be modified based on a function of the tangent of the geometric boundary (eqns. 1a, 1b, 5a and 5b), and based on a function of the approaching or retreating obstacle state (eqns. 3a, 3b, 6a and 6b), such that the vehicle will be directed away from the obstacle. The method is continuous at the boundary surface because when the vehicle is just inside of the boundary, the vehicle is directed to fly along a tangent of the boundary, therefore providing a continuous transition through the boundary. The avoidance direction is transitioned from the boundary tangent, to a direction away from the boundary tangent, based on (for example) the distance $\gamma$ from the obstacle (eqns. 1a, 1b, 5a and 5b). When the vehicle has sufficiently avoided the obstacle, the avoidance command is transitioned from an avoidance trajectory to the desired trajectory (eqns. 3a, 3b, 6a and 6b).

These concepts of avoidance are not limited to the specific geometric spaces (i.e., 3-dimensional space) as described previously. These avoidance concepts may be used to avoid acceleration, velocity, or other mathematically defined obstacles in N dimensional space. The implementation methodology will be the same. That is to say, the application of eqns. 1 through 6 would be the same, although the weighting functions associated with those equations would become more complicated. An implementation for such an algorithm can be in the avoidance of guidance algorithm singularities, whereby the resulting guidance command would be the zero vector. This construction can involve the position, velocity and the acceleration of the vehicle as well as the position, velocity and acceleration of the target.

For instance, one of ordinary skill in the art will appreciate that a mathematically defined obstacle to be avoided can include a singularity in a vehicle primary control algorithm at which a defined response does not exist. Accordingly such singularity can be mathematically defined as an obstacle to be avoided by the avoidance algorithm of the present invention. With this approach, the avoidance algorithm will cause the vehicle to be maneuvered such that it does not reach a state where the primary control algorithm is at a singularity.

Another implementation could be in the construction of an avoidance algorithm to control the body orientation of a vehicle during approach to a destination so that the line of sight to the destination is maintained to be not more than X degrees off the vehicle bore-sight (x-direction). In this instance the obstacle is not a material item but a mathematical construction. In addition, the boundary surface for this construction is a cone emanating from some point relative to the vehicle along the body x and having a cone angle of 2X. The avoidance algorithm would be constructed using the same equations as before. However, the definitions of the weighting functions would be more involved.

Second Embodiment

Operational Boundary Avoidance

EXAMPLE 1

Minimum Altitude

Application of the method and system of the present invention to avoidance of operational boundaries (rather than obstacles) is described next as a second preferred embodiment. As will be explained further below, the basic approach is the same as outlined for the first embodiment.

Figure 5:
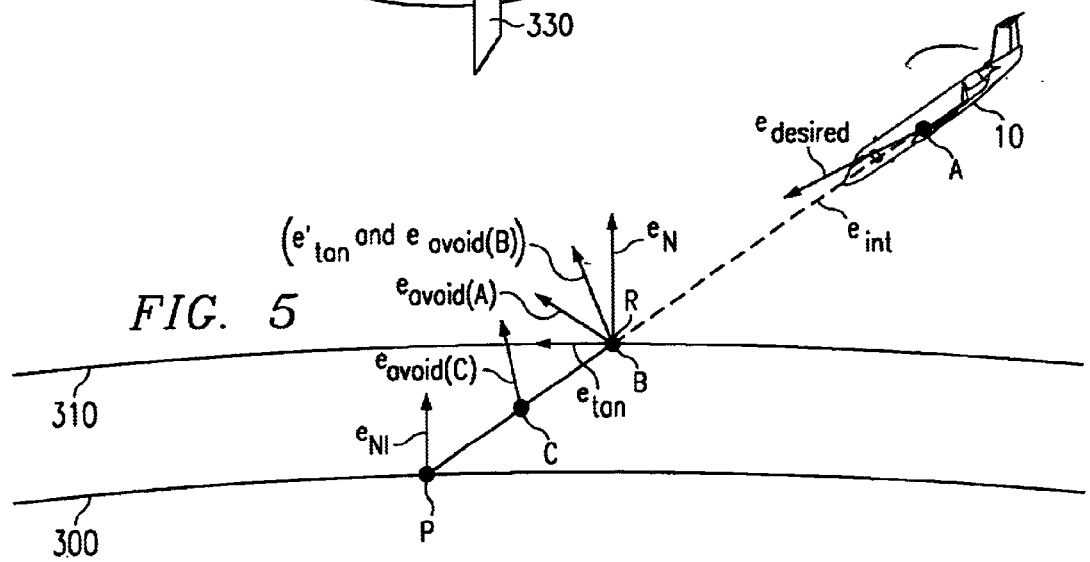
FIG. 5 shows an operational boundary, such as a minimum altitude, to prevent the vehicle from flying below a minimum altitude boundary limit.

Operational boundaries, outside of which a vehicle travels normally, can be addressed with the method of the present invention as described above. For instance, as illustrated in FIG. 5, if an operational boundary for a vehicle is a minimum altitude, a sphere can be used as a geometric boundary 310 having a center located at the center of the earth and having a radius suitable to place a surface of the sphere at the desired minimum altitude. Accordingly, by following the approach described above for avoidance of obstacles, the vehicle 10 would avoid flying below the minimum altitude boundary 310 and hence not impact the surface 300. In this situation, an oblate spheroid represents the minimum altitude boundary 310 of the vehicle 10 and corresponds to the obstacle 300 in the prior descriptions. As will be appreciated by those skilled in the art, the geometric boundary 310 described in all examples and embodiments herein is not limited to a sphere surrounding an object 300 and may be a continuous regular or irregular geometry which may be fluid in shape and as complicated as required.

FIG. 5 illustrates the avoidance guidance command $e_{avoid}$ for a vehicle 10 in each of positions A, B and C shown. In FIG. 5, R represents the surface point of tangency on the minimum altitude boundary surface and P represents an intercept point on the surface 300 to be avoided. Vector $e_{NI}$ represents normal vector to the surface to be avoided at point P. The other vectors shown in FIG. 5 have the same meaning as do the vectors by the same names shown in FIGS. 3A, 3B and 4. Equations used to solve for $e_{avoid}$ for a vehicle 10 located at positions A, B, and C are similar to those of eqns. (1a) through (6b) above.

EXAMPLE 2

Maximum Altitude

Another operational boundary which can be addressed by the present invention is a maximum altitude boundary. Like the minimum altitude boundary situation illustrated in FIG. 5, the maximum altitude boundary scenario illustrated in FIG. 6 uses an oblate spheroid to represent the maximum ceiling 300, which corresponds to a surface of the obstacle 300 in the prior descriptions. A maximum ceiling geometric boundary 310 is defined a predetermined distance from the maximum ceiling spheroid 300 and the approach described above for the First Embodiment is used to determine avoidance guidance commands for the present conditions.

Figure 6:
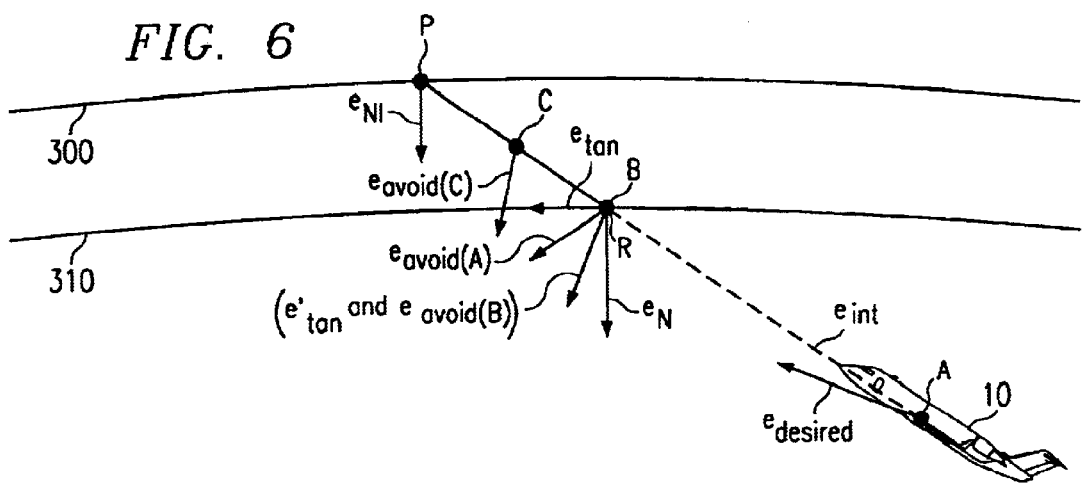
FIG. 6 shows an operational boundary, such as a maximum altitude, to prevent the vehicle from climbing above the boundary limit.

FIG. 6 illustrates the avoidance guidance command $e_{avoid}$ for a vehicle 10 in each of positions A, B and C shown. In FIG. 6, R represents the surface point of tangency on the maximum altitude boundary 310 and P represents an intercept point on the surface 300 to be avoided. Vector $e_{NI}$ represents normal vector to the surface 300 to be avoided point P. The other vectors shown in FIG. 6 have the same meaning as the vectors by the same names shown in FIGS. 3A, 3B and 4. Equations used to solve for $e_{avoid}$ for a vehicle 10 at positions A, B and C are similar to those of eqns. (1a) through (6b) above.

EXAMPLE 3

Use for Navigation of a Submerged Vehicle

While the geometric boundary surfaces have been illustrated thus far as surfaces of simple geometry, and while the exemplary vehicles described thus far have been aircraft or missiles, the method of the present invention is equally applicable to other types of implementations. For instance, the method can be applied to the navigation of a submarine while traveling submerged and can be applied to boats and shipping vessels as well.

Figure 7:
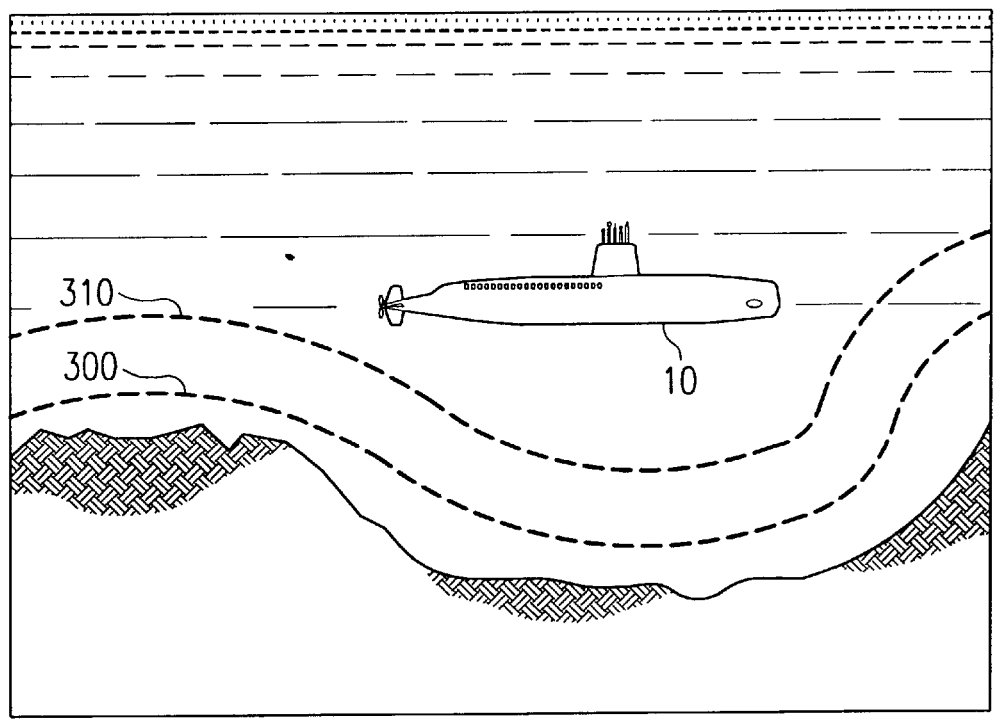
FIG. 7 shows an operational boundary to prevent a vehicle, such as a submarine, from entering a specified boundary area.

FIG. 7 illustrates an irregularly shaped geometric boundary surface 310 as may be applied in an application for obstacle avoidance for a submarine 10 application. The actual terrain to be avoided can be simulated by a smoothed surface 300 to simplify the topography of the geometric boundary surface 310. Because the relevant guidance vectors and determination of avoidance guidance command $e_{avoid}$ are the same as illustrated and described in regard to the prior examples, FIG. 7 omits these details for brevity and clarity. However, equations used to solve for $e_{avoid}$ in this application are similar to those of eqns. (1a) through (6b) above.

EXAMPLE 4

Avoidance of Moving Obstacles

While the above example situations illustrate obstacles which a vehicle must avoid, the present method is equally applicable to avoidance of active threats or moving obstacles. In the case of an approaching threat, if the position of the threat is known, a geometric boundary can be defined around the threat position and the geometric boundary position of the threat can be continually updated. A vehicle which is being guided in accordance with the present method will thus automatically be directed to avoid the boundary and thus the threat position even as the obstacle or threat moves in relation to the moving vehicle.

Figure 8:
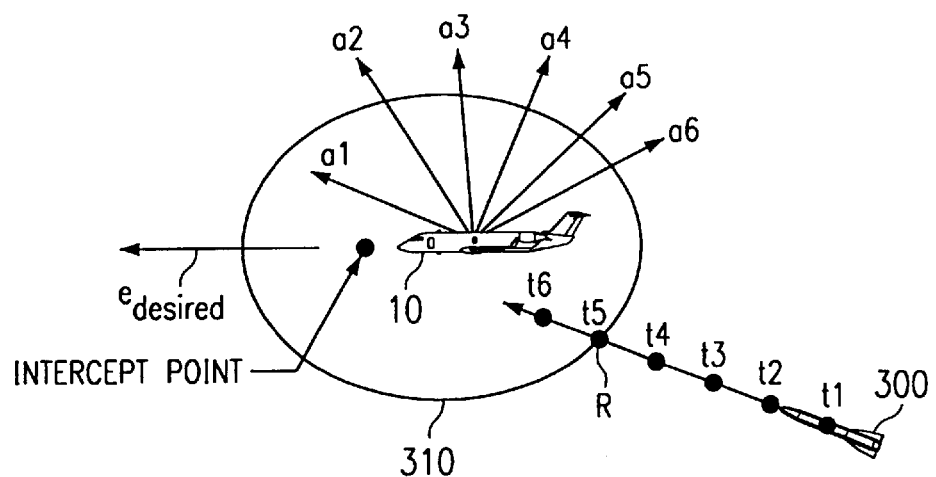
FIG. 8 shows a vehicle avoidance process using the present invention in the situation where the vehicle is being pursued by a threat.

Avoidance of a threat is illustrated in FIG. 8 showing a moving vehicle 10 having a geometric boundary 310 moving with the vehicle 10, and a moving obstacle to be avoided, a missile 300. As illustrated in FIG. 8, the avoidance commands change, due to use of the present method, based on the relative position between the moving vehicle 10 and the moving threat missile 300. Specifically at threat positions t1, t2, t3, t4, t5 and t6, the corresponding avoidance guidance commands are shown as a1, a2, a3, a4, a5 and a6. In the case corresponding to threat position t1, where the missile 300 is outside the geometric boundary 310, the commands are blended between the desired flight path $e_{desired}$ and the tangent based avoidance path $e'_{tan}$. In the case corresponding to threat positions t2–t4, where the missile is outside the geometric boundary but closer than position t1, the weighting of the tangent based avoidance direction is increased. In the case corresponding to threat position t5, where the missile is at the surface point of tangency, R, the avoidance command a5 is based on the geometric boundary tangent avoidance command $e'_{tan}$. In the case corresponding to threat position t6, where the missile is inside of the geometric boundary 310, the avoidance command is weighted between an anti-intercept command and a tangent based command as described in eqns. (5a) and (5b) above for the First Embodiment. Thus, $e'_{tan}$ and the functions used to calculate it must be reevaluated at each point along the flight path to continually update the steering command, $e_{avoid}$. Because the relevant guidance vectors and determination of avoidance guidance command $e_{avoid}$ are the same as illustrated and described in regard to the prior examples, FIG. 8 omits these details for brevity and clarity. However, equations used to solve for $e_{avoid}$ in this application are similar to those of eqns. (1a) through (6b) above.

EXAMPLE 5

Avoiding Moving Object Launched from Moving Vehicle

Figure 9A:
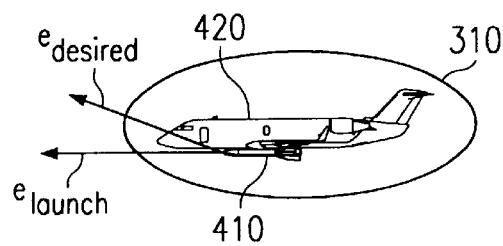
FIG. 9A illustrates a missile launch from an aircraft without using the present invention to prevent the missile from impacting the launching aircraft.

As noted in the background of the invention, one shortcoming with the conventional avoidance technique based on use of geometric boundary shapes occurs in the situation of launching a missile from an aircraft. Specifically, because the conventional boundary shape method requires that the geometric shape be made very small so that the vehicle and the missile are not both inside the geometric shape, the resulting geometric shape would be smaller than the vehicle to be avoided and the missile would thus be able to fly into the launching aircraft. As illustrated in FIG. 9A, at the time of launch, a missile 410 and launching aircraft 420, both within the geometric shape 310, have the same velocity and direction vector. The desired missile guidance command, however, would potentially cause the missile 410 to pull up upon launch and strike the aircraft 420.

Figure 9B:
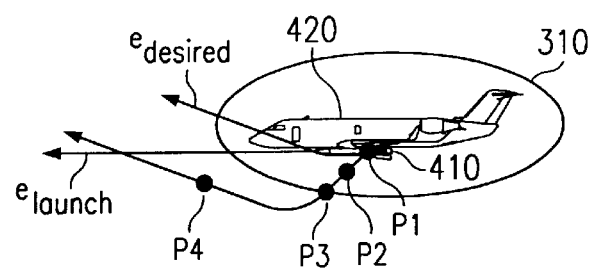
FIG. 9B shows an application of a missile launch from an aircraft using the present invention to prevent the missile from impacting the launching aircraft.

In contrast, the method according to present invention, is able to provide avoidance guidance commands which will cause a launched missile 410 to avoid the aircraft 420 from which it is launched. As illustrated in FIG. 9B, a launched missile 410 would first maneuver outside of the geometric boundary 310 which surrounds the aircraft 420 and then turn onto the desired guidance course. More specifically, FIG. 9B shows the missile guidance states at four points during the launch and flight sequence, P1, P2, P3, and P4. At positions P1 and P2, which correspond to the situation where the missile 410 is inside the geometric boundary 310, the boundary tangent vector and a vector having a direction opposite to the center of the aircraft are blended together to obtain the avoidance command as described above with reference to the First Embodiment. (In this example, the center of the aircraft is defined as a reference point on the aircraft that represents the whole aircraft). At position P3, which corresponds to the situation where the missile 410 is at the surface of the geometric boundary 310, the avoidance command is based on the geometric boundary tangent avoidance vector. At position P4, which corresponds to the situation where the missile 410 is outside of the geometric boundary 310, the avoidance command is obtained by blending together the geometric boundary tangent command $e'_{tan}$, and the desired missile guidance command, precisely as shown and illustrated in FIG. 3A and as described in the text accompanying FIG. 3A. Thus, $e'_{tan}$ and the functions used to calculate it must be reevaluated at each point along the flight path to continually update the steering command, $e_{avoid}$. Because the relevant guidance vectors and determination of avoidance guidance command $e_{avoid}$ are the same as illustrated and described in regard to the prior examples, FIG. 9B omits these details for brevity and clarity. However, equations used to solve for $e_{avoid}$ in this application are similar to those of eqns. (1a) through (6b) above.

Third Embodiment

Control of Vehicles in Formation

The method by which the present invention may be used for control of vehicles traveling in formation is described next as a third preferred embodiment. This embodiment builds on previous embodiments with the addition of sink elements for position, velocity and other state control.

As previously noted, an object to be avoided, and/or the surrounding region, can be referred to as a source element, while objects or regions towards which the vehicle is attracted can be referred to as sink elements.

EXAMPLE 1

Geometric Boundary Formed from Source and Sink Elements

As indicated above, the method of the present invention may be used to maintain control of vehicles in formation and to maintain the position and separation of the vehicles in that formation. One approach in accordance with the present method is to replace the source elements inside of a geometric boundary with sink elements in combination with previously mentioned avoidance boundaries. Because a vehicle is attracted to sink elements, the sink elements will thus guide the vehicle to a particular location or guide the vehicle to a particular speed and location, and keep the vehicle from colliding with other vehicles in the formation.

Figure 10B:
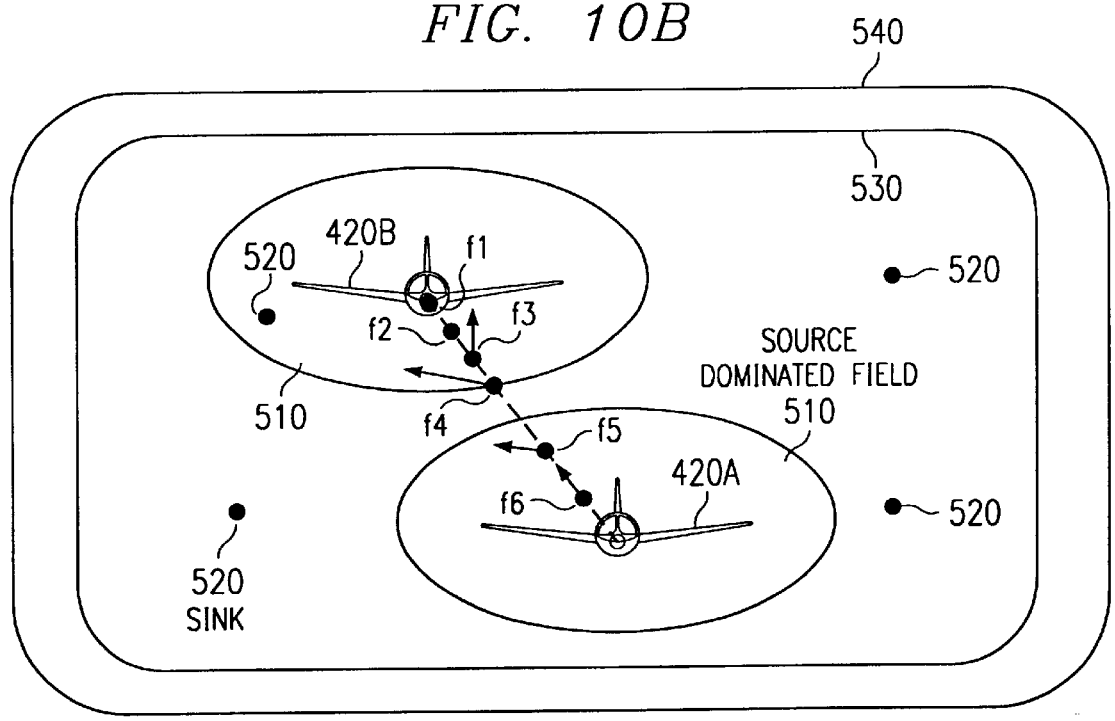
FIGS. 10A and 10B show an application of the present invention to control vehicles traveling together in formation.
Figure 10C:
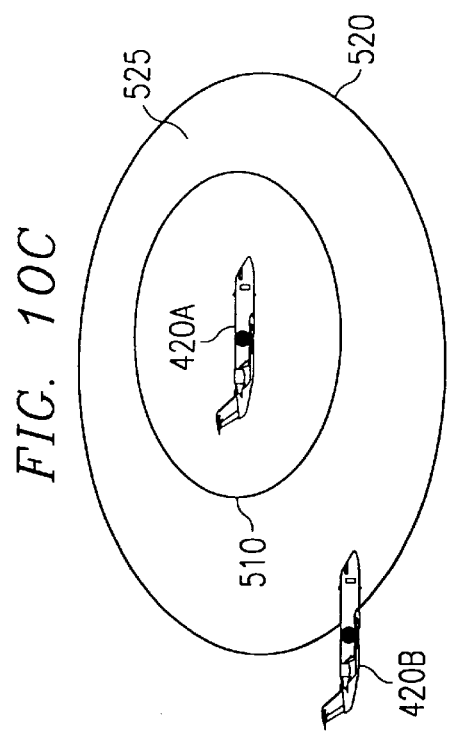
FIGS. 10C through 10E show another application of the present invention to control vehicles traveling together in formation.
Figure 10A:
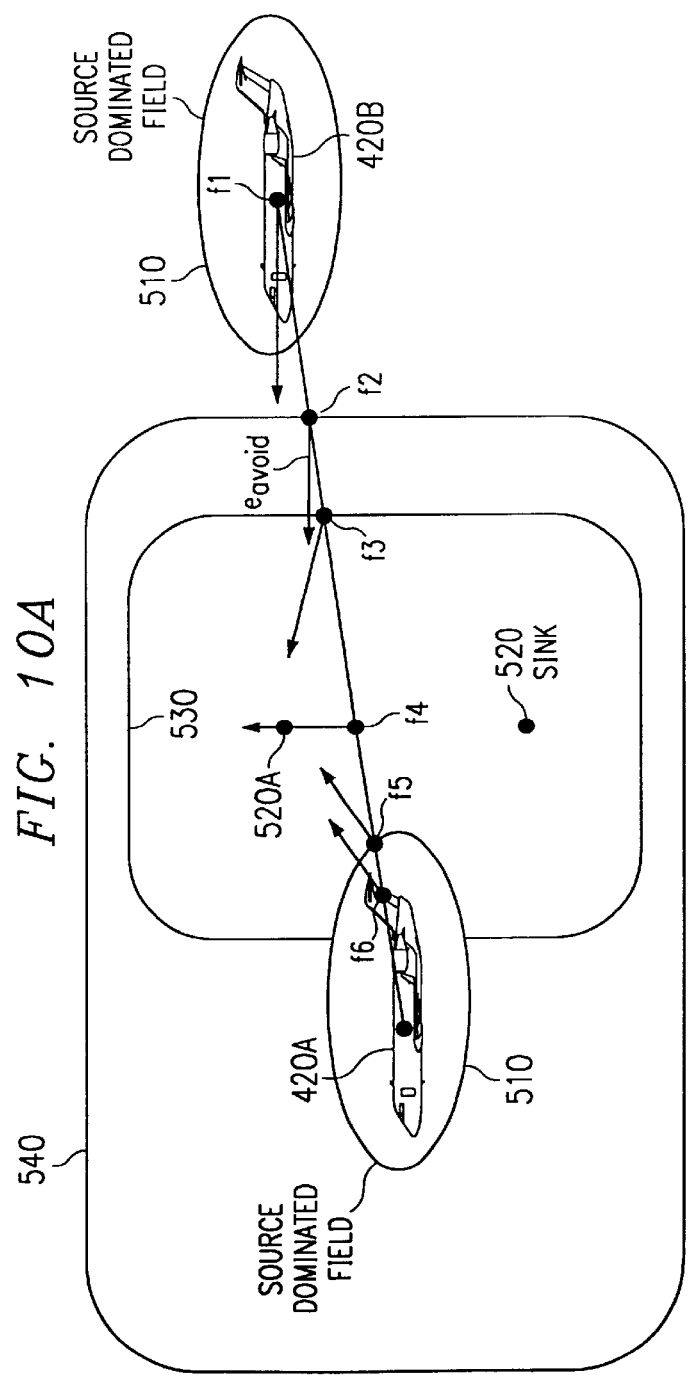

FIGS. 10A and 10B illustrate the situation where two aircraft 420A and 420B are operating in a formation. In one approach, lead aircraft 420A provides data to trailing aircraft 420B which defines for trailing aircraft 420B acceptable positions of formation flight. This provided data defines for trailing aircraft 420B geometric sink elements 520. FIG. 10A is a side view of the aircraft 420A and 420B in formation. Also shown are boundaries 510 around each aircraft 420A and 420B, respectively, which is the limit of extent of the source potential field which can be defined. Boundary 540 represents a limit of the extent of the source tangent field. Boundary 530 represents a limit of the extent of the sink potentials, and the sink potentials have no geometric based avoidance vector outside of this boundary. Inside this boundary, the strength of sink 520 is defined by functions $k_1(x)$ and $k_2(x)$, which are constructed similar to $f_2(x)$ and $f'_2(x)$, where the definition of L is now a surface. Thus sink 520 will only attract objects which are within the limit of boundary 530. The boundaries 510 will operate as geometric boundaries 310 described in the First and Second Embodiments, thereby preventing collision of the aircraft 420A, 420B while sinks 520 guide the aircraft 420A, 420B to predefined relative positions.

The mechanism by which the effects of sinks 520 are added to the spatial avoidance guidance equations is as follows: Inside the boundary 530, the vector $e_{attract\text{-}sink}$ is constructed such that $$E_{attract\text{-}sink} = k_1(x)e_{sinkpnt} + k_2(x)e_{desired} \qquad (7a)$$

where $e_{sinkpnt}$ is a vector in the direction from the vehicle to a center of a sink; where $0 \leq k_1(x) \leq \infty$ and $0 \leq k_2(x) \leq \infty$, such that $k_1(x)$ and $k_2(x)$ are not both zero; and where $k_1(x)=0$, when the vehicle 10 is coincident with surface L (not shown), and $k_2(x)=0$, when the vehicle 10 is coincident with the sink 520. Both $k_1(x)$ and $k_2(x)$ are linear or non-linear continuous functions with x being a parameterized constant, function, or family of functions as described above. As above, functions $k_1(x)$ and $k_2(x)$ should be constructed such that $\|E_{attract\ sink}\| \neq 0$.

The vector $e_{attract\text{-}sink}$ is calculated in equation 7b based on $E_{attract\text{-}sink}$ computed in equation 7a:

$$e_{attract\text{-}sink} = E_{attract\text{-}sink} / \|E_{attract\text{-}sink}\| \qquad (7b)$$

As will be appreciated by those skilled in the art, the $e_{attract\text{-}sink}$ directional vector is then mixed with the $e_{avoid}$ command, per eqns. 8a and 8b below, to get $e_{avoid\text{-}final}$, thus preventing collisions.

$$e_{avoid\text{-}final} = E_{avoid\text{-}final} / \|E_{avoid\text{-}final}\| \qquad (8a)$$

$$E_{avoid\text{-}final} = z_1(x)e_{desired} + z_2(x)e_{tan} \qquad (8b)$$

where $0 \leq z_1(x) \leq \infty$ and $0 \leq z_2(x) \leq \infty$, such that $z_1(x)$ and $z_2(x)$ are not both zero; and where $z_1(x)=0$, when the vehicle 10 is coincident with surface L (not shown), and $z_2(x)=0$, when the vehicle 10 is coincident with the sink 520. Both $z_1(x)$ and $z_2(x)$ are linear or non-linear continuous functions with x being a parameterized constant, function, or family of functions as described above. As above, functions $z_1(x)$ and $z_2(x)$ should be constructed such that $\|E_{avoid\text{-}final}\| \neq 0$.

The $e_{attract\text{-}sink}$ directional vector then becomes the $e_{desired}$ vector of the first two examples. Hence, as the following vehicle approaches the leading vehicle, it will be directed toward the sink locations and away from the leading vehicle. As the following vehicle begins to slow or recede, depending on the definition of the transition zone, it will begin to ignore the avoidance commands and be directed toward the sink locations. The transition zone definition becomes important in this discussion.

For formation maneuvering, such as flying, the transition zone can be dynamically varied and/or its influence dynamically increased or decreased over time, space, or based on the condition of the vehicles, to more specifically tailor the effect on the vehicles. Specifically, for instance, in the situation where aircraft are joining a formation, the transition zone can be brought into existence only when certain condition(s) are satisfied, such as when the rate of closure between the vehicles is below a specified threshold. Similarly, the transition zone can be removed when one aircraft begins to recede from another. With such an approach, if an aircraft is approaching another aircraft at too great a speed, the transition zone, and hence the effect of the attracting sink, does not influence the guidance of the vehicle, but instead the avoidance algorithm, unaffected by the sink, will command the vehicle to maneuver so as to avoid a collision. However, once the avoidance algorithm-based control commands have moved the vehicles into a safe separation distance, the transition zone will be created and the $e_{attract\text{-}sink}$ vector-based effect will head the vehicle towards the desired position for formation flying. Therefore, even if the vehicles are approaching each other with too much speed, the avoidance algorithm will cause them to avoid each other. When the vehicles start to move apart and have reached a safe distance, the $e_{attract\text{-}sink}$ vector will once again be the desired direction toward which the vehicle will fly.

Note the implementation described above, and shown in FIGS. 10A and 10B, differs from the previously described embodiments in that no geometric based avoidance commands are generated by the sink elements. Specifically, the geometric-based commands developed through the aircraft avoidance, using 420 and 510, are blended with the non-geometric-based attracting commands to define the final formation flying guidance command.

FIG. 10A also shows the formation avoidance commands which are generated for aircraft 420B at each of six relative positions between aircraft 420A and 420B. Specifically, FIG. 10A shows six arrows representing the formation avoidance command that aircraft 420B would receive if aircraft 420B were located at the corresponding formation position f1, f2, f3, f4, f5 and f6, respectively. As trailing aircraft 420B approaches leading aircraft 420A, the corresponding avoidance commands steer aircraft 420B to the sink 520. If aircraft 420B closely approaches aircraft 420A so that it comes within the range of the source field 510 surrounding aircraft 420A, then aircraft 420B would receive a further guidance command so as to avoid a collision.

Aircraft 420A and 420B can break formation either by overriding the above described guidance method, or can break formation while still under such guidance method by turning off the sinks 520. In the absence of the attracting force from the sinks 520, the aircraft 420A and 420B would separate.

It will be appreciated that the size and location of the boundaries and the sinks must be tailored to achieve the desired spacing and relative positions of the vehicles in a given formation. Because the present invention is not limited to a fixed size or shape boundary, the size and shape of the boundaries can be adjusted to achieve the objectives of a particular situation. For instance, increasing the geometric boundary size results in avoidance commands which are able to act at a further distance from a vehicle. On the other hand, decreasing the boundary size will allow a second vehicle (or threat) to move closer to a first vehicle before avoidance guidance commands would be generated.

Moreover, for formation flying, the size of the boundaries may be dynamically altered based on the relative velocity between the vehicles. For instance, when the relative velocity between vehicles is nearly zero, the size of the boundaries may be reduced to a minimum safe size. However, when the relative velocity between the vehicles is large, the size of the boundaries can be increased to allow collision avoidance protection within the maneuverability limits of the vehicles.

FIGS. 10A and 10B also show that a given situation can include multiple sinks 520 and/or sources 510 within a single boundary 530. The present invention can be applied with an arbitrary number of sink potential elements each representing individual points, or many sink potentials may collectively define a sink surface or curve.

EXAMPLE 2

Dual Zone Combined Source and Sink Geometric Boundary

Another possible method for obstacle avoidance when flying in a formation is shown in FIG. 10C. A multi-zone method having a source geometric boundary 510 emanates from a point and surrounds vehicle 420A thereby defining a first zone 510. A sink geometric boundary 520 emanates from the same point on vehicle 420A and surrounds source geometric boundary 510 thereby creating a second zone or interactive region 525 between the source geometric boundary 510 and the sink geometric boundary 520. Within the source geometric boundary 510, the avoidance vector is computed as shown in the First Embodiment. Beyond the sink geometric boundary 520, the avoidance vector is computed as disclosed above in the Second Embodiment. Within the interactive region 525 between source geometric boundary 510 and sink geometric boundary 520, the avoidance vector is computed as a combination of the repelling force of the source geometric boundary and the attracting force of the sink potential of the sink geometric boundary. A resulting relative avoidance vector may thereby be computed for each point within the interactive region 525.

The spatial guidance method of Example 2 above operates such that when vehicle 420B is flying outside the dual geometric boundaries 510, 520, vehicle 420B is attracted to sink boundary 520 and the avoidance vector is directed toward vehicle 420A. When vehicle 420B is within the interactive region 525, the relative avoidance vector directs vehicle 420B to maintain a position within that region 525 based on weighted functions. As vehicle 420B approaches source geometric boundary 510, the repelling component of the relative avoidance vector is increased or weighted in favor of the direction away from vehicle 420A, thereby effectively directing vehicle 420B away from vehicle 420A. As vehicle 420B moves away from source geometric boundary 510, the attracting component of the relative avoidance vector is increased or weighted in favor of the direction toward vehicle 420A, thereby effectively directing vehicle 420B toward vehicle 420A.

The benefit of this approach is that solutions need be computed for only one source and one sink. Further, this approach allows one vehicle in formation to move independently of another in all directions within the interactive region surrounding one of the vehicles. Further, depending upon the requirements, the boundaries of the source and sink may be formed in any size and shape. Equations for calculating the avoidance vector within the interactive region are similar to equations (1a) through (8B) above. As one of ordinary skill in the art will appreciate, the equations above would be applied in the same manner, adjusted for the particular geometry of the embodiment.

Figure 10D:
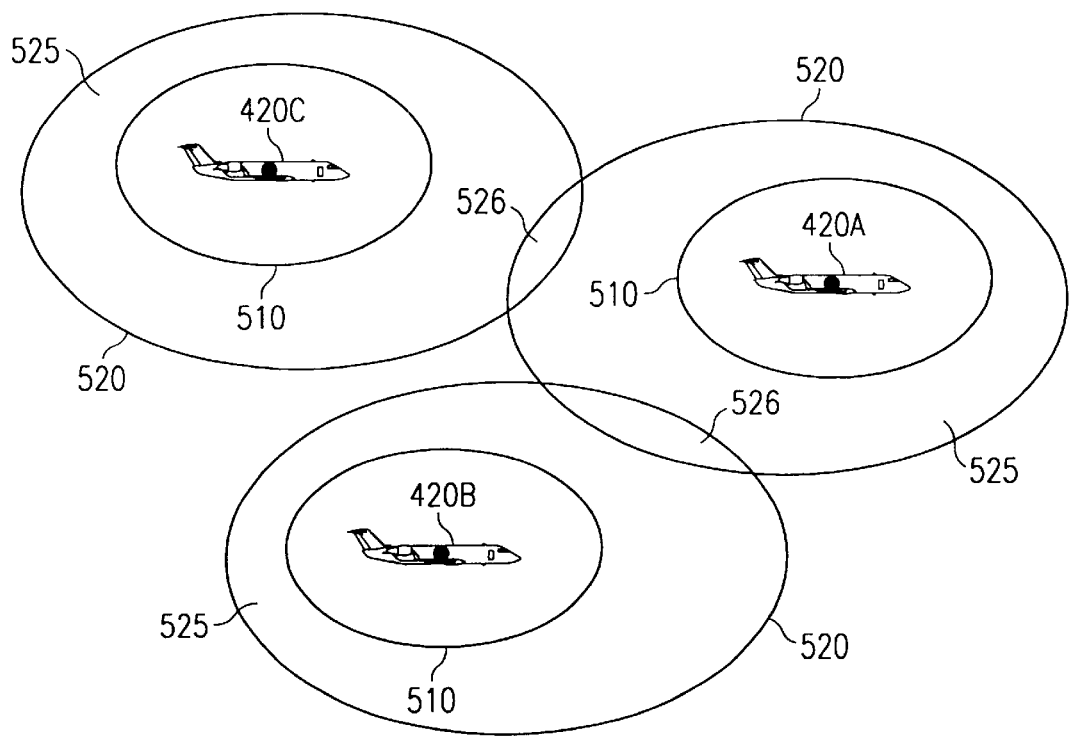
Figure 10E:
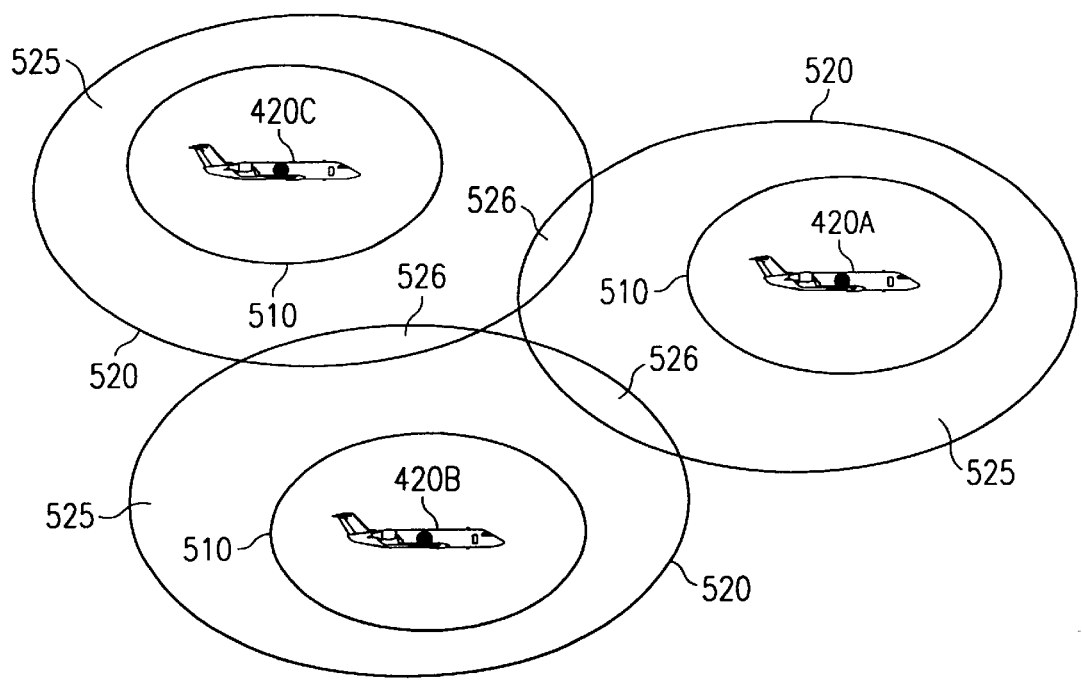

In a modification of this approach shown in FIG. 10D, all vehicles in formation could have dual source and sink geometric boundaries, thereby providing a region surrounding each vehicle for formation flight and affording more complete vector avoidance control during formation flight. As shown, a sink overlap region 526 forms between sink geometric boundaries of vehicles flying within a relatively close proximity to a boundary region of another vehicle. By this method, it is possible to calculate the appropriate steering vector for a plurality of vehicles and to maintain a desired separation distance between them during formation flight. As one of ordinary skill in the art will appreciate, the equations above would be applied in the same manner, adjusted for the particular geometry of the embodiment. Equations for calculating the interrelated avoidance vectors within the interrelated interactive regions of multiple vehicles are significantly more complicated than with the simple prior examples. However, these equations are functionally similar.

Exemplary Field Diagrams Generated by Using the Method for Multiple Source and Sink Conditions The method of the present invention and the results of the application of the present invention are further explained by vector field diagrams in FIGS. 11–19. These vector field diagrams are simulation results from the application of the method of the present invention as applied to several situations comprising stationary impediments and/or stationary vehicles in a two dimensional space. The reason for applying the present invention to a two dimensional space and to stationary impediments and/or stationary vehicles in the following discussion is for simplicity of explanation only. Those of skill in the present art will appreciate that the present invention can be applied with equal ease for dimensions above two and for both moving impediments and vehicles, however, static figures representing such dynamic situations are more difficult to render. Additionally, while the geometric boundaries shown in FIGS. 11–19 consist of circles and planes, this is not a limitation of the present invention. In practice, the boundaries can be represented by any smooth function.

FIGS. 11–19 were constructed using weighting functions of the following form which also illustrate the intent of the general function descriptions of eqns. 1a though 6b discussed in the First Embodiment. However, for clarity and brevity when discussing specific examples of the present method, the following discussion will be limited and specifically directed to that of the First Embodiment. It will be understood that the method could be similarly applied to and similar results computed for all embodiments discussed herein.

Referring now to FIGS. 11–19, the equations used to calculate the vector diagrams include:

$$E'_{tan} = h_1(x)e_N + h_2(x)e_{tan} \quad (A)$$

where $h_1(x) = 0.0$, and $h_2(x) = 1.0$.

Further, equations include:

$$E_{avoid} = f_1(x)e_{desired} + f_2(x)e'_{tan} \quad (B)$$

where when $e_{desired} \cdot e_{r0} < 0$, $f_1(x) = x$ where $r_{dist}/r_0$, and $f_2(x) = -x*(e_{desired} \cdot e_{tan}) + \sqrt{1 - x^2 \cdot (1 - (e_{desired} \cdot e_{tan})^2)}$ where $r_{dist}$ is the distance from the current point to the nearest point on the obstacle, and $r_0$ is the distance from the current point to the obstacle definition point.

A result of the above $f_1(x)$ and $f_2(x)$ construction is that $E_{avoid}$ is now a unit vector having direction and unit magnitude and hence:

$e_{avoid} = E_{avoid}$.

Further, as computed according to the equations of the First Embodiment:

$$E^*_{tan} = g_1(x,\gamma)e_{desired} + g_2(x,\gamma)e'_{tan}, \quad (C)$$

where the functions $g_1(x, \gamma)$ and $g_2(x, \gamma)$ were implemented as shown in the following. In the equations below, two principle situations must be considered:

(A) where $(e_{desired} \cdot e_{r0}) < 0$ and
(B) where $(-e_{rt0} \cdot e_{r0}) \leq 0$. In the following equations:
  x is defined above as $(x = r_{dist}/r_0)$
  γ is a boundary defined by the following conditional statements.

In the first situation (A) where, $(e_{desired} \cdot e_{r0}) < 0$, two subcases must be considered:

(1) When: $(-e_{rt0} \cdot e_{r0}) > 0$ and $(-e_{rt0} \cdot e_{desired}) > 0$ then $g_2(x, \Upsilon) = (1 + (e_{desired} \cdot e_{r0})(-e_{rt0} \cdot e_{r0})(-e_{rt0} \cdot e_{desired}))$, with $g_1(x, \Upsilon) = -g_2(x, \Upsilon) * (e'_{tan} \cdot e_{desired}) + sqrt(1 - g_2(x, \Upsilon)^2 *$ $(1 - (e'_{tan} \cdot e_{desired})^2))$, when $e'_{tan} \cdot e_{desired} > 0$, and $g_1(x, \Upsilon) = sqrt(1 - g_2(x, y)^2)$, when $e'_{tan} * e_{desired} \leq 0$.

(2) Otherwise, when $(-e_{rt0} \cdot e_{r0}) \leq 0$ or when $(-e_{rt0} \cdot e_{desired}) \leq 0$
  $g_1(x, \gamma) = 0.0$
  $g_2(x, \gamma) = 1.0$.

In the second situation (B) where, $(e_{desired} \cdot e_{r0}) < 0$, two cases must be considered:

(1) when: $(e_{desired} \cdot e_{r0}) < 1$
  $g_2(x, \gamma) = (1 - (e_{desired} \cdot e_{r0})) * x$
  $g_1(x, \gamma) = -g_2(x, \gamma) * (e'_{tan} \cdot e_{desired}) + sqrt (1 - g_2(x, \gamma)^2 * (1 - (e'_{tan} \cdot e_{desired})^2))$.

(2) otherwise when: $(e_{desired} \cdot e_{tan}) \geq 1$
  $g_1(x, \gamma) = 1.0$
  $g_2(x, \gamma) = 0.0$.

In each of the above, $e_{r0}$ is the unit vector from the current point to the obstacle definition point, $e_{rt0}$ is the unit vector from the destination to the nearest point on the obstacle, and where x is a continuous function. The symbol "·" represents the vector dot product function.

The above example illustrates the types of blending functions used in the development of the examples, and does not represent specific algorithms required to implement the method of the invention.

As shown in FIGS. 11–19, each point in the field represents a possible location of a vehicle, and the small line coming from each point indicates the direction of the avoidance guidance command ($e_{avoid}$) which the vehicle would receive if located at that point. In each of FIGS. 11–19, the nominal desired guidance command from any one of the points in the vector field is a straight line from that point to the desired destination.

Specifically, FIG. 11 represents a situation where only one obstacle 300 is present. As noted above, the nominal desired guidance command 611 is a vector originating from any one of the points 612 in the vector field is a straight line in a direction from that point 612 to the desired destination 610. As can be seen in FIG. 11, the direction of the guidance command 611, as indicated by the direction of the small lines which radiate from the location points 612, is a function of the location of the point within the field relative to both the obstacle 610 and the destination. For points 612 which are far from the obstacle 300, such as points 612 in the upper right hand corner of the field, the direction of the guidance command 611 is nearly straight towards the destination 610 and is essentially unaffected by the obstacle 300.

In contrast, points 612 which are behind the obstacle 300, relative to the destination 610, indicate a direction of the guidance command 611 which will steer a vehicle (not shown) smoothly around the obstacle 300. It should be noted the degree to which the guidance command 611 differs from the nominal desired direction varies as a function of the distance from the point 612 to the boundary 620. This is because the guidance command 611 is determined by blending together the nominal desired direction and $e_{int}$ in varying proportion depending on distance from the obstacle 300.

It should also be noted that the direction of the guidance command 611 for each point smoothly transitions from the interior of boundary 620 to the exterior of boundary 620. Thus, vehicles can be smoothly controlled even in the case where obstacle geometric boundaries 620 are crossed.

Figure 12:
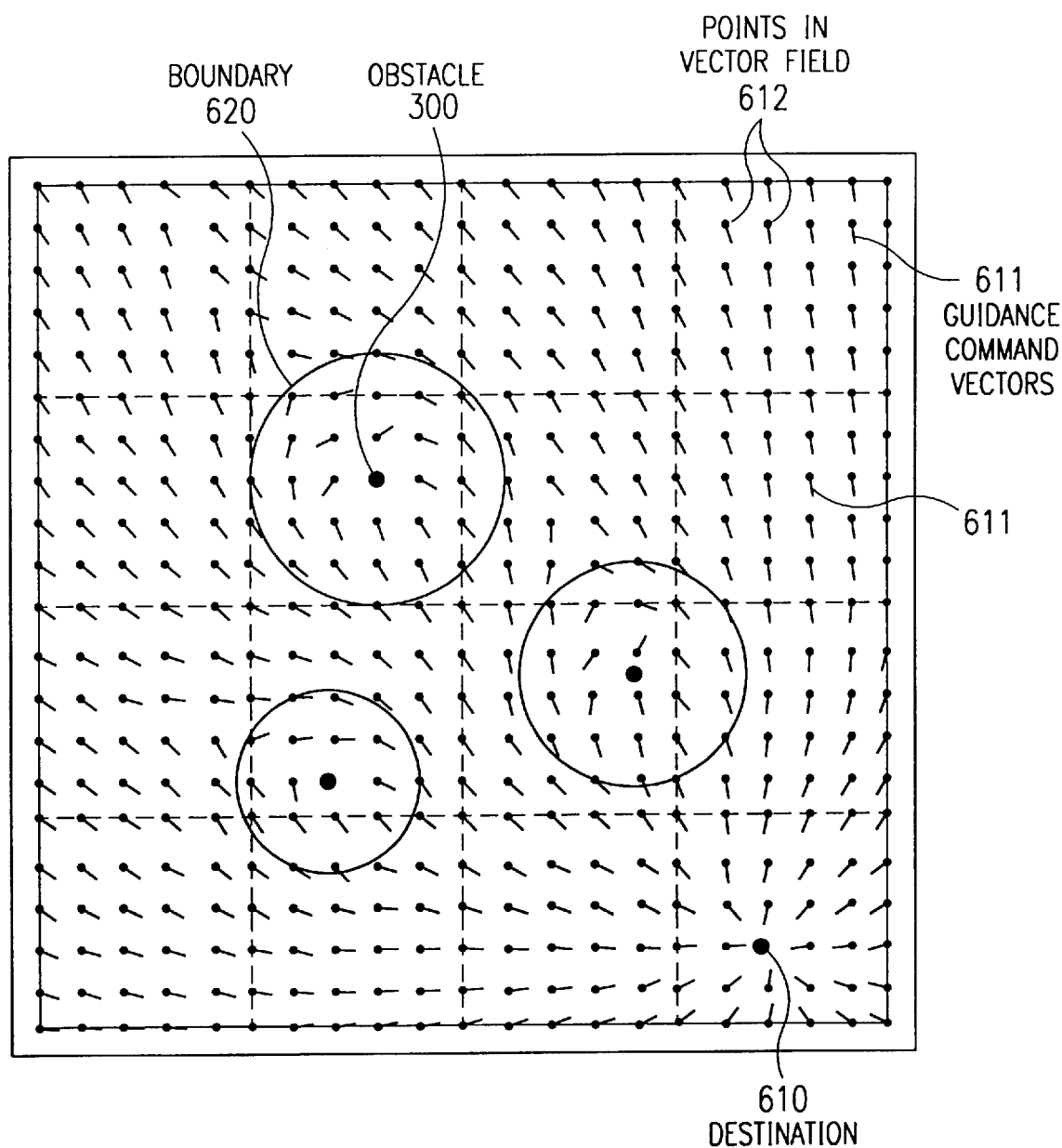
FIG. 12 is a vector field diagram representing a situation where multiple obstacles are present in the vector field.

FIG. 12 represents a situation where multiple obstacles are present in the vector field. While only one obstacle is shown with a reference number 300 in FIG. 12, each of the three black dots which are surrounded by a circle are obstacles 300, the surrounding circle of each obstacle 300 is its corresponding boundary 620. In the case where more than one obstacle 300 is present, an avoidance direction for each obstacle is calculated for each of the positions or points 612 in the vector field. Then, a weighting function is used, for each position 612, to prioritize the guidance commands calculated based on each of the several obstacles 300. By weighting the contribution of each calculated guidance command and blending them together to produce a single normalized guidance command 611, the influence of multiple obstacles 300 can be simultaneously addressed.

In weighting the calculated guidance commands, two operational zones were defined and separate weighting functions were defined for application in each zone. The first operational zone is inside a boundary and the second operational zone is outside a boundary.

In the case where the point is inside the boundary, weighting function (10a) below is used. In the case where the point is outside of the boundary, weighting function (11a) is used.

$$W_I = M/(\%_{RI}) \tag{10a}$$

$$W_O = 1/(\%_{RI} \cdot R^2 \cdot \text{MAX}(\%_{RO}, M/(\%_{RI}))) \tag{11a}$$

where $(\%_{RI})<1$ inside the geometric boundary, and $(\%_{RI})>1$ outside the geometric boundary.

As can be seen from equation (10a) above, in the case of a point which is inside the boundary, for the avoidance vector calculated from each of the obstacles, the avoidance vector is divided by the percent of intrusion into the geometric boundary ($\%_{RI}$) along $e_{int}$ and multiplied by M, the number of obstacles in the space. To determine the composite (or final) avoidance command, all of the scaled avoidance commands are summed and the result normalized to produce the final avoidance commands as shown by the guidance command vectors in FIG. 12. Thus, determination of the final avoidance command can be expressed as shown below in equation (10b).

$$e_{avoid} = \frac{\left(\sum e_{avoid(n)} \cdot W_{I(n)}\right)}{\|\sum e_{avoid(n)} \cdot W_{I(n)}\|} \tag{10b}$$

where n is the number 1 through M of the point being considered in the weighting function.

As can be seen from equation (11a) above, in the case of a point which is outside the boundary, for the avoidance vector calculated from each of the obstacles, the avoidance vector is weighted by a non-linear function which is a function of the percent distance outside of the boundary relative to the local geometric boundary radius ($\%_{RO}$), the local geometric boundary radius R, and $W_I$.

As with points inside the boundary, to determine the composite (or final) avoidance command, all of the scaled avoidance commands are summed and the result normalized to produce the final avoidance command. Thus, determination of the final avoidance command can be expressed as shown below in equation (11b).

$$e_{avoid} = \frac{\left(\sum e_{avoid(n)} \cdot W_{O(n)}\right)}{\|\sum e_{avoid(n)} \cdot W_{O(n)}\|} \tag{11b}$$

It should be noted that the weighting function used to weight the avoidance commands calculated from each of the obstacles is not limited to functions (10a) and (11a) as described above and other weighting functions can be used.

The guidance command vectors shown in FIGS. 13–19 were determined based on the same weighting approach described above for FIG. 12.

Figure 13:
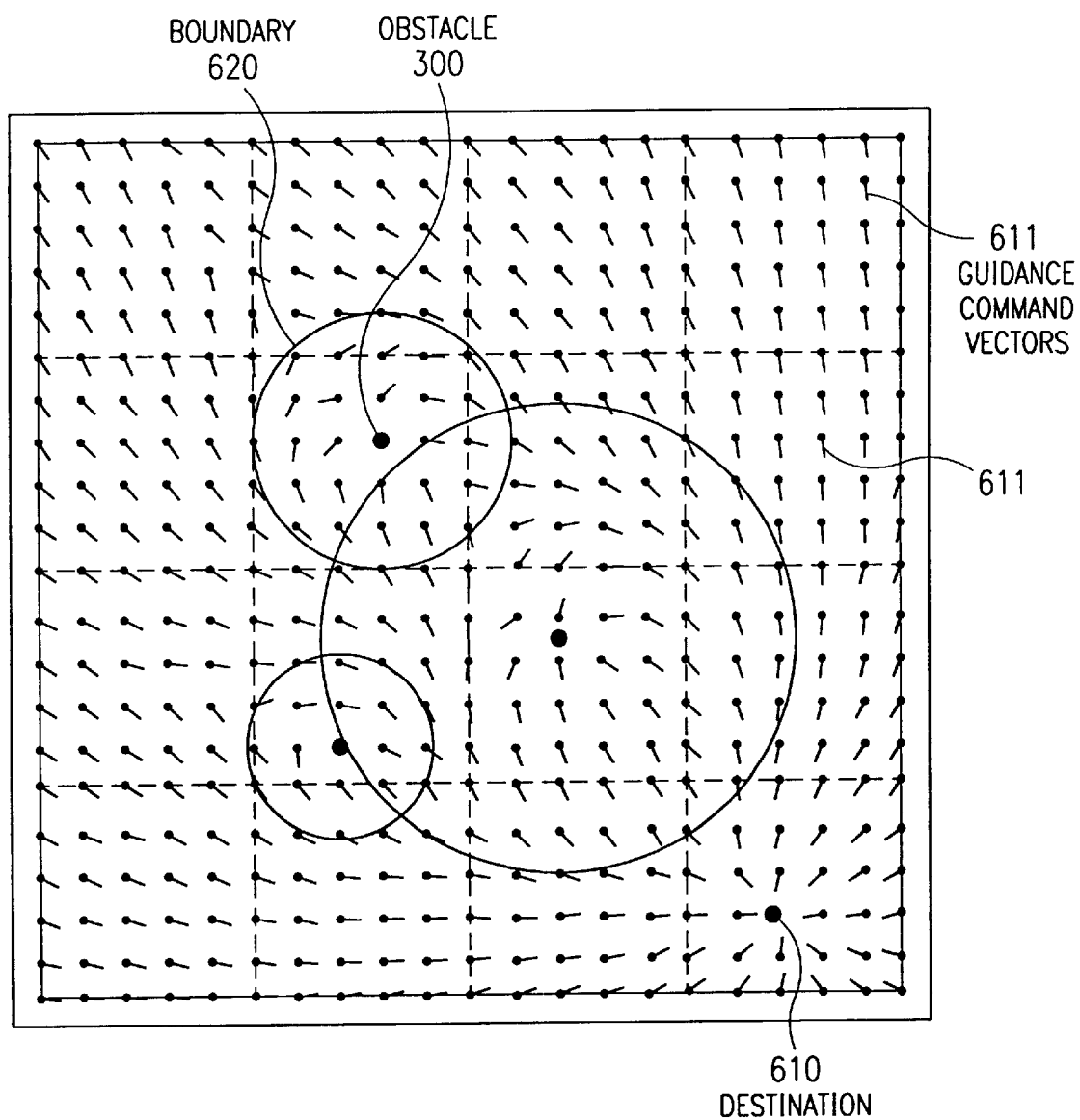
FIG. 13 is a vector field diagram representing the presence of multiple obstacles in the vector field with intersecting obstacle boundaries.

FIG. 13 represents a situation where multiple obstacles are present in the vector field and where the boundaries 620 of the obstacles overlap. While only one obstacle 300 has a reference number in FIG. 12, each of the three black dots which are surrounded by a circle are obstacles 300, the surrounding circle of each obstacle is its corresponding boundary 620. The guidance command vectors shown in FIG. 13 were determined based on the same weighting approach described above for FIG. 12.

Figure 14:
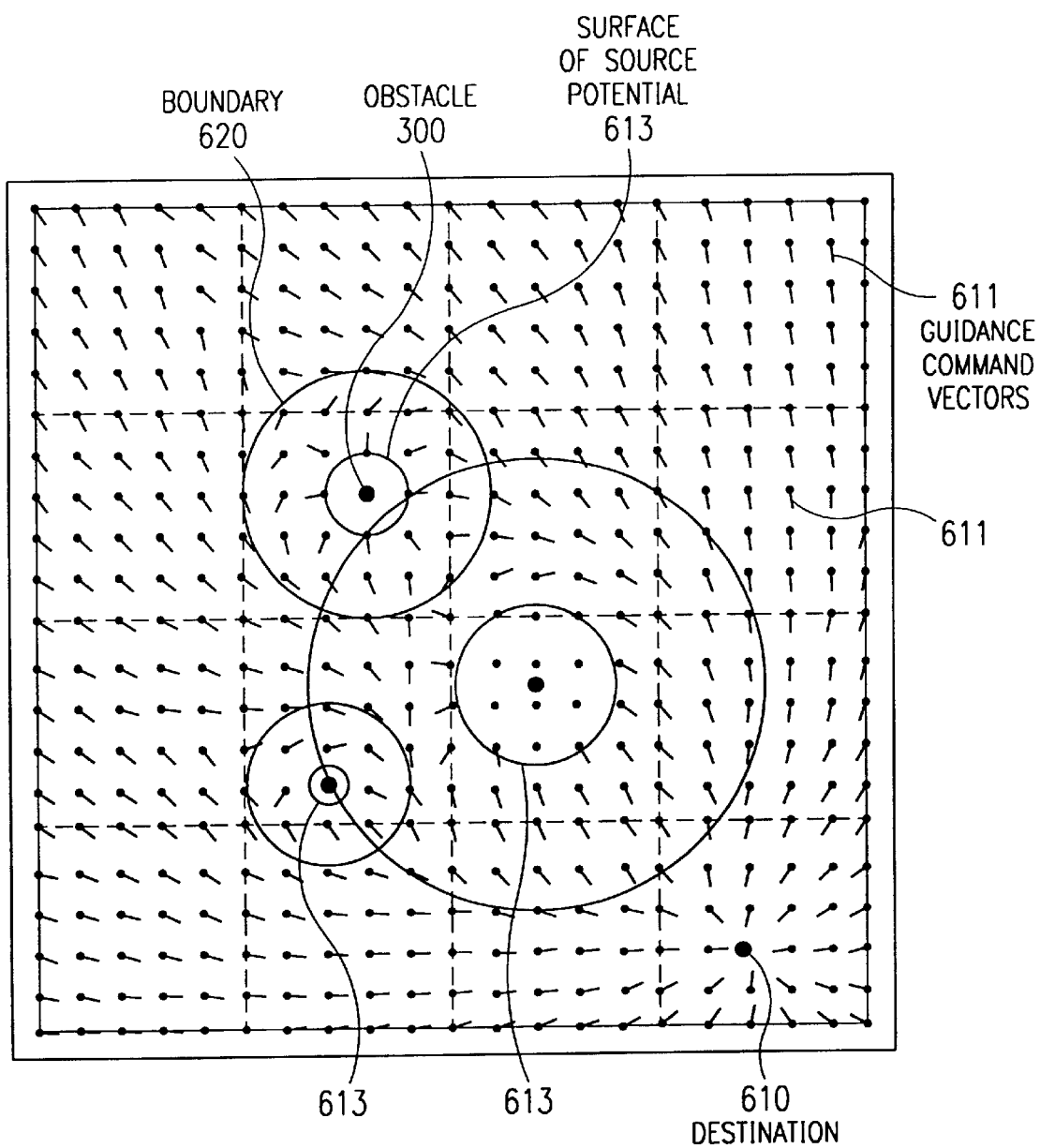
FIG. 14 is a vector field diagram representing the presence of multiple obstacles having finite size with intersecting obstacle boundaries.

FIG. 14 represents a situation which is essentially similar to that shown in FIG. 13 but where the obstacle is modeled as a curve or surface composed of an infinite number of source elements. The calculation of $\%_{RI}$ is based on the length from the boundary surface 620 to the source surface 613 along $e_{int}$ rather than from the boundary surface 620 to the center of the impediment location 300.

Figure 15:
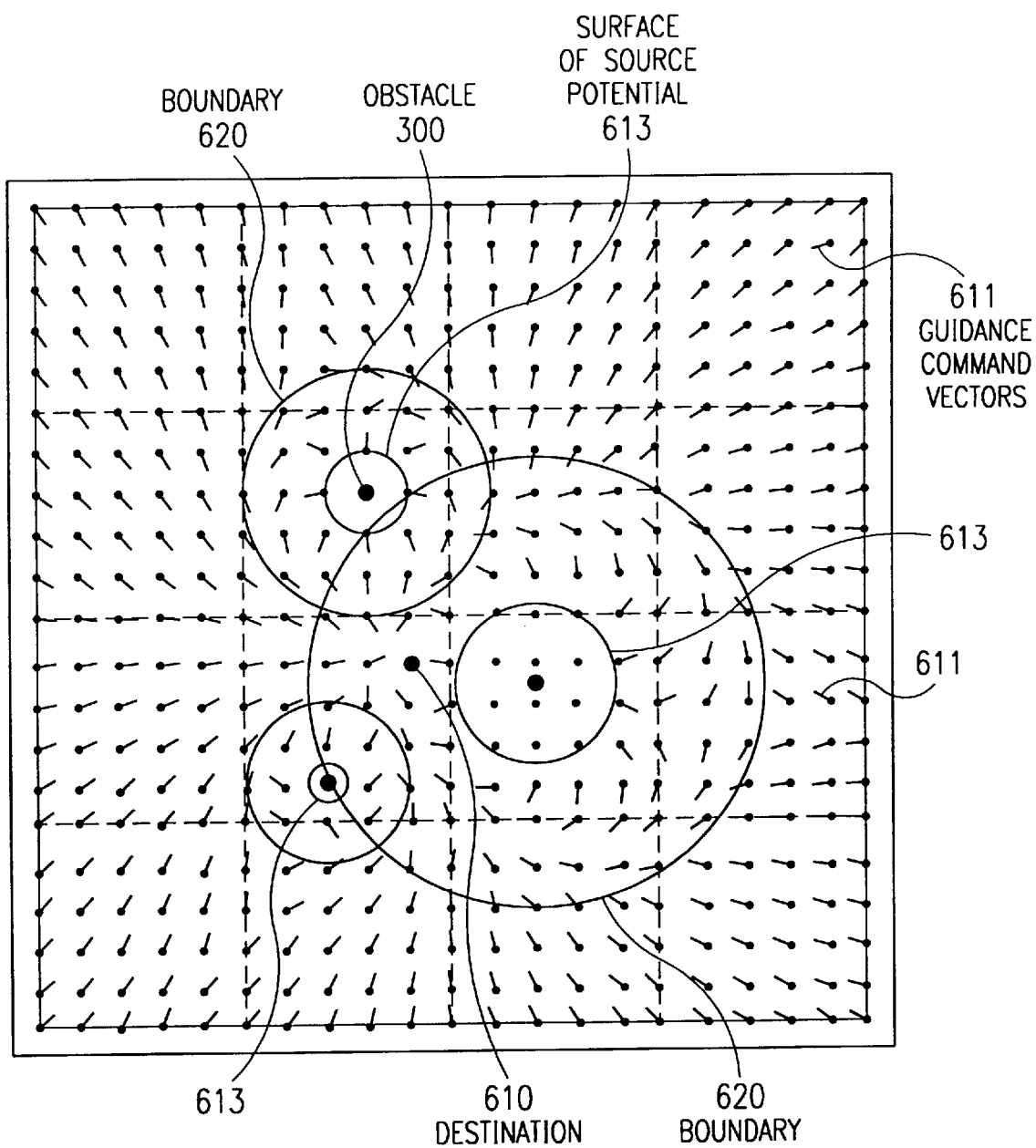
FIG. 15 is a vector field diagram representing the presence of multiple obstacles having finite size with intersecting obstacle boundaries where the destination is inside a geometric boundary.

FIG. 15 represents a situation which is essentially similar to that shown in FIG. 14 but where the destination 610 is inside a geometric boundary 620. It should be noted here that the guidance command vectors 611, as shown, will steer a vehicle into a geometric boundary 620 to reach the destination while avoiding the surface of the source potentials 613.

Figure 16:
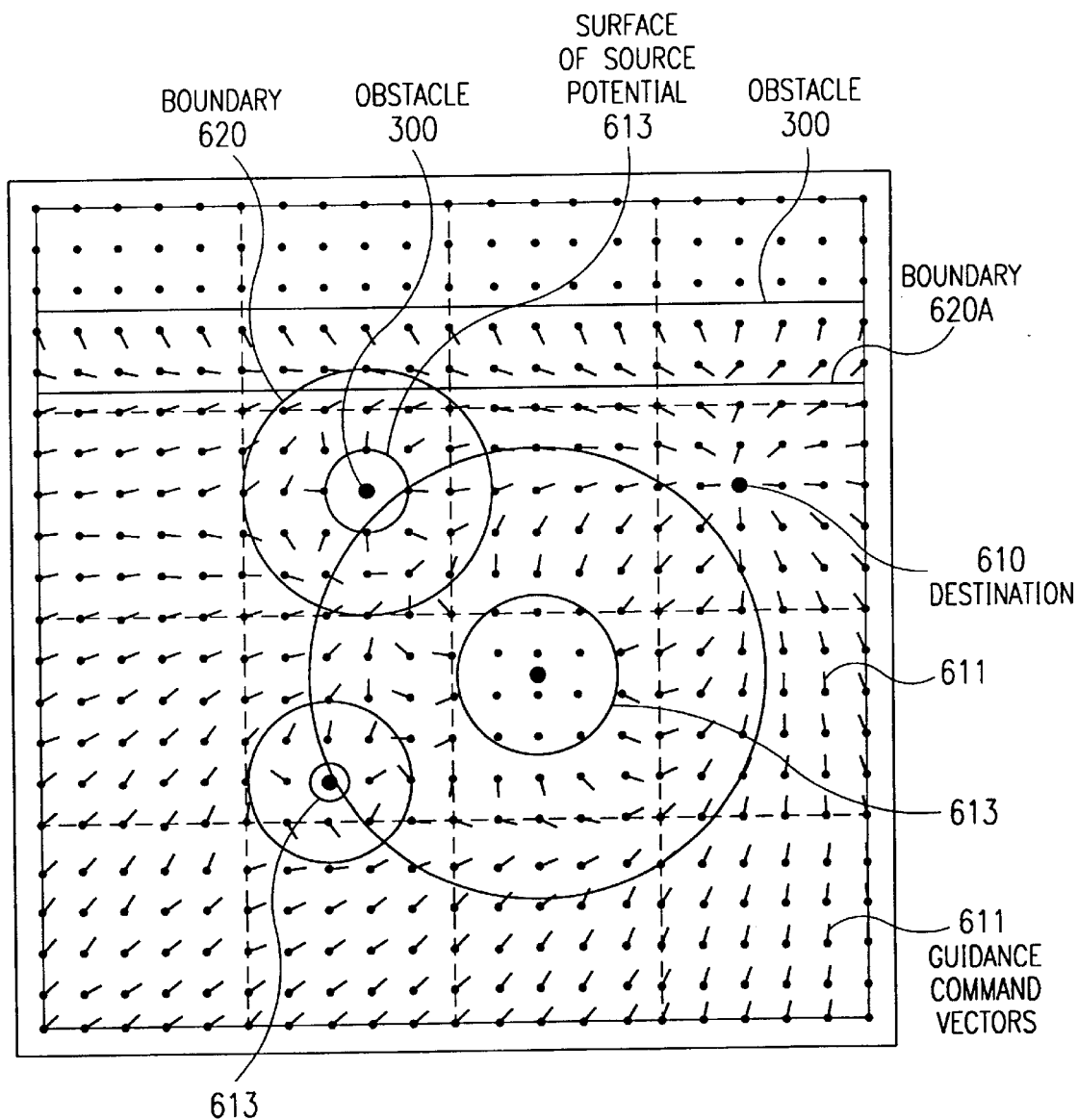
FIG. 16 is a vector field diagram representing the presence of multiple obstacles having finite size with intersecting obstacle boundaries and the presence of a non-closed infinite boundary surface.

FIG. 16 represents a situation which is essentially similar to that shown in FIG. 14 but where one of the boundaries 620 is an operational boundary 620A such as a maximum ceiling and is thus a non-closed infinite impediment in the avoidance vector solution.

Figure 17:
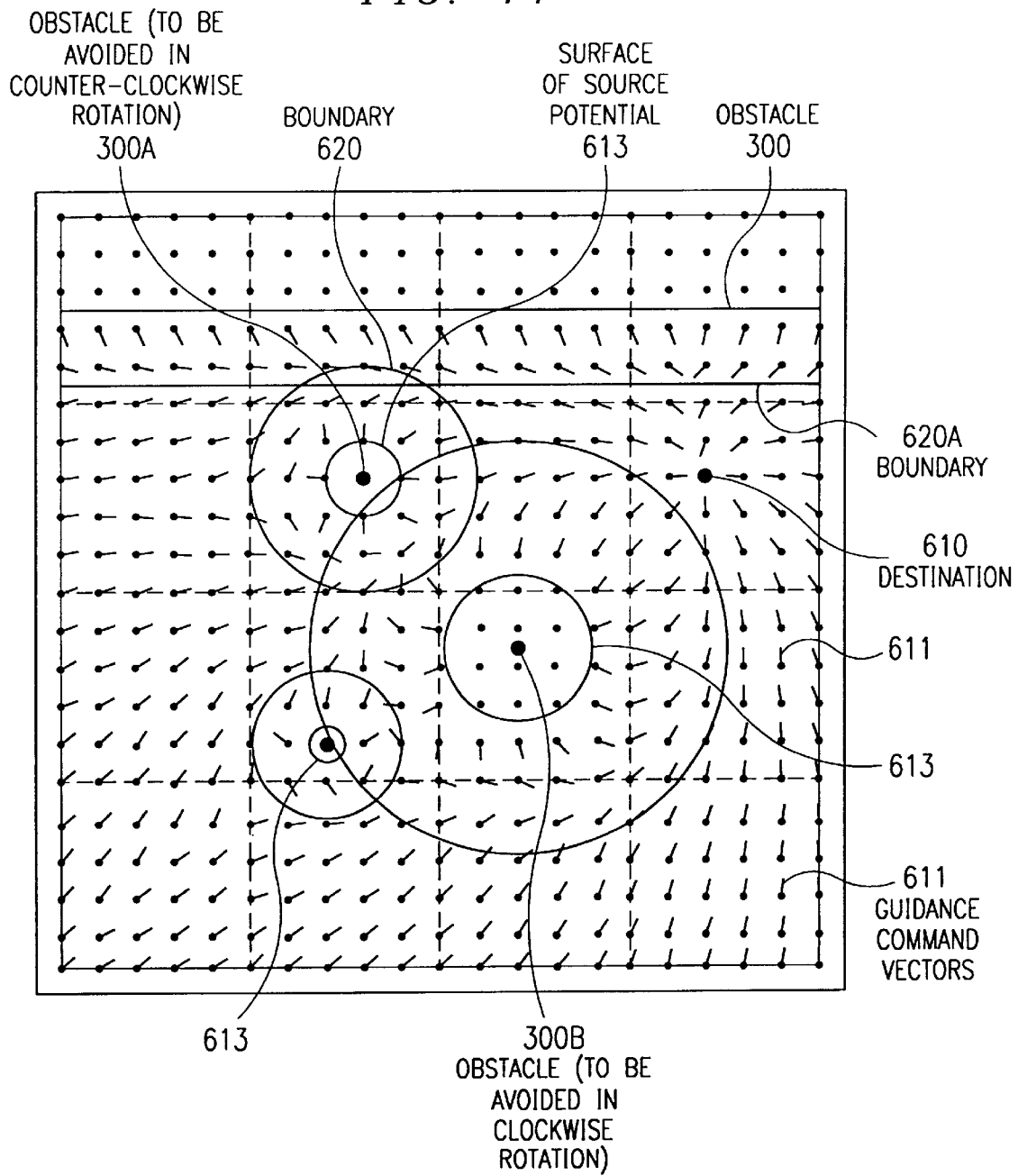
FIG. 17 is a vector field diagram representing the presence of multiple obstacles having finite size with intersecting obstacle boundaries, the presence of a non-closed infinite boundary surface, and with tangent boundary direction control.

FIG. 17 represents a situation which is essentially similar to that shown in FIG. 16 and which demonstrates an additional aspect of the present invention. Specifically, in the prior discussions, the tangent vector to the geometric boundary was always described as being in the direction of the desired guidance command. In some situations such as controlled traffic patterns, it is desirable to use the tangent vector to the geometric boundary in a direction which is independent from the desired guidance command. Such a use of the tangent control is applicable to the management of shipping lanes or other traffic patterns where there are rules with respect to which size vehicles should be avoided. Accordingly, in FIG. 17, one of the obstacles 300B has been defined to direct the current point in a direction clockwise around the obstacle; another of the obstacles 300A has been defined to direct the current point in a direction counter-clockwise around the obstacle.

Figure 18:
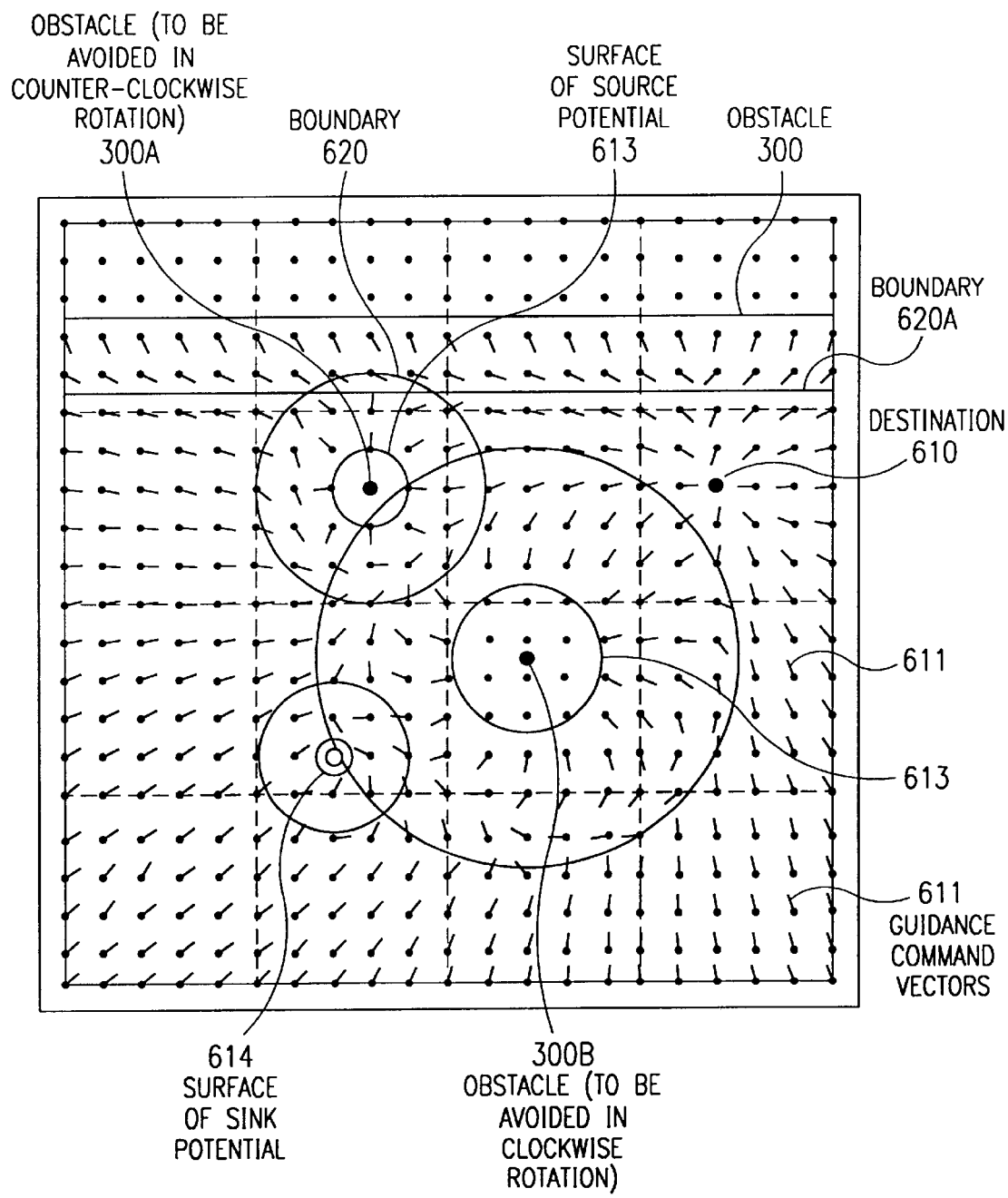
FIG. 18 is a vector field diagram representing the presence of multiple obstacles having finite size with intersecting obstacle boundaries, the presence of a non-closed infinite boundary surface with tangent boundary direction control, and with multiple potential types.

FIG. 18 represents a situation which is essentially similar to that shown in FIG. 17 which demonstrates an additional aspect of the present invention. Specifically, one of the source elements has been substituted by a sink curve element 614. As discussed above, such an element has the effect of attracting a vehicle to its location. This type of arrangement can be applied in logistics planning models where a collection area is defined for accumulation of vehicles at a location. Once the vehicles have been collected at that location, the sink element 614 could be dissipated to permit the accumulated group to progress through the remainder of the space to the final destination 610. FIG. 18 also illustrates aspects of formation flying as discussed with reference to the Third Embodiment.

Figure 19:
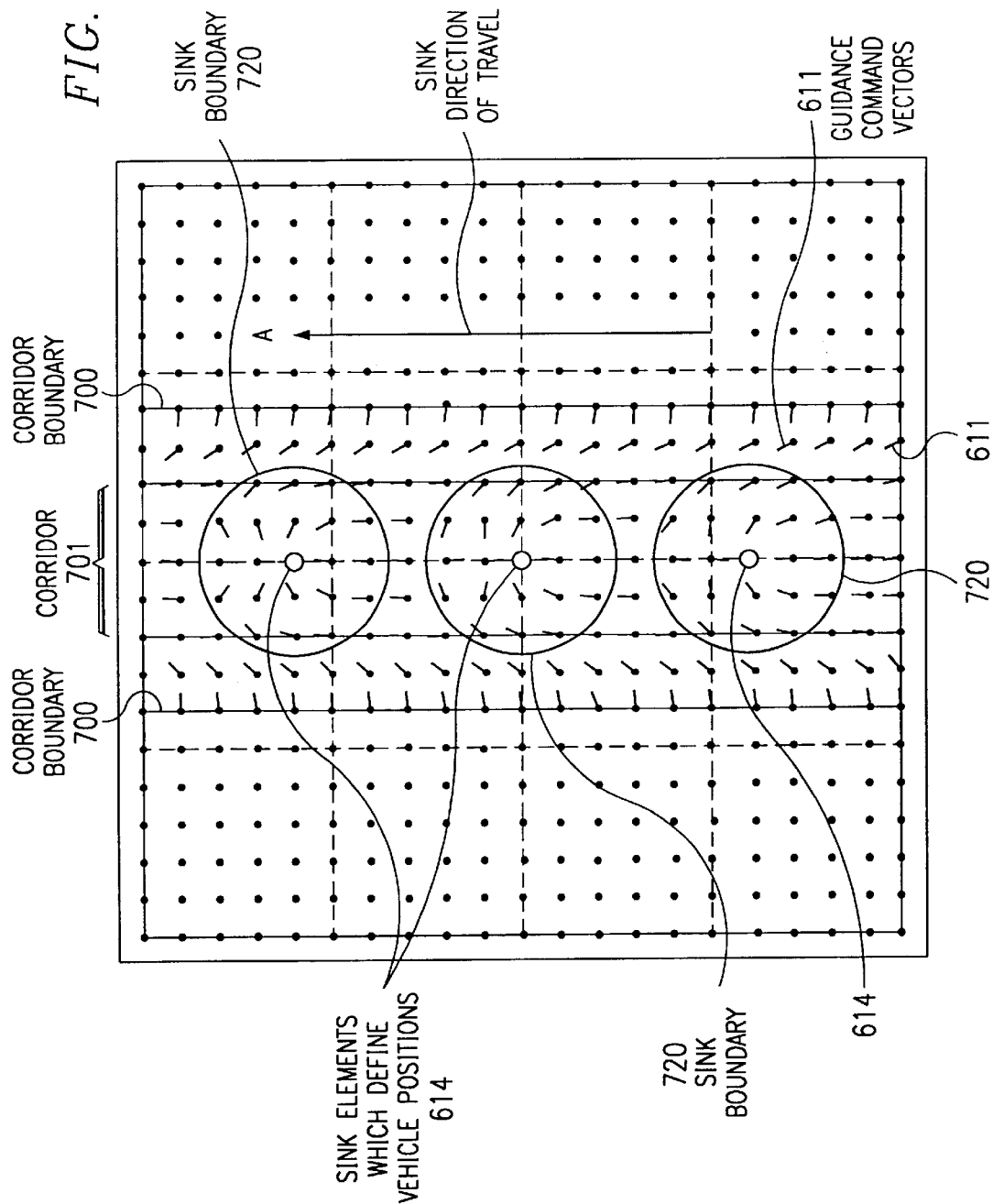
FIG. 19 is a vector field diagram illustrating application of the present invention for use as an automated flow manager in traffic corridor.

FIG. 19 represents a situation applicable in traffic management. In this arrangement, sink elements 614 are defined so as to move along a defined corridor 701 in the direction of arrow A. Because vehicles are attracted to the sinks 614, and because the sinks 614 are controlled to move along the defined corridor 701 in a controlled manner, the vehicles will automatically join and follow the controlled travel of the sinks 614. As shown in FIG. 19, the corridor 701 has boundaries 700 which tend to confine to the corridor 701 vehicles which have not yet moved into position at a sink 614. Also as shown, the boundary 720 of each sink 614 can be sized in accordance with the size of the corridor 701.

Fourth Embodiment

6 Degree of Freedom (6-DOF) Control where Both Vehicle and Object are within a Geometric Boundary Use of the method of the present invention for control of vehicles in 6DOF is described next as a Fourth Embodiment.

As shown in FIGS. 14–19, obstacles 300 are contained within, or positioned behind, geometric boundaries 620. However, according to the Fourth Embodiment of the present invention shown in FIGS. 20 and 21, both the vehicle to be controlled and the obstacles are contained within geometric boundary surfaces which can be used to determine the control required for vehicles and objects operating in 6-DOF.

As will be described next, in the case where both the vehicle 810 to be controlled and the obstacles 800 to be avoided are contained within geometric boundary surfaces 811a, 811b, an interaction between the surfaces within a field of influence 813 will produce a moment about the guided vehicle. This moment can be used to extend the guidance approach and method.

More specifically, the approaches and methods described thus far for controlling missile systems can provide directional guidance in only 3 Degrees-of-Freedom (3-DOF) (i.e., translations along the directions x, y, and z axes). However, in the situation where a source potential curve or surface 811b is used to represent the guided vehicle 810 and a source potential curve or surface 811a is also used to represent an obstacle 800, an extension of the guidance commands 611 to 6-DOF (i.e., both translations along and rotations about each of the directions x, y, and z) can be achieved. Specifically, the 6-DOF method, however, requires additional state information than the previous 3-DOF embodiments. The previous embodiments do not require attitude information, whereas 6-DOF control requires knowledge of the vehicle 810 attitude along with other state information. Further, additional implementations of the 6-DOF guidance system can be generated if threat, obstacle, or target attitude information is also provided.

Specifically, the effect can be constructed by using the vector $e_{int}$ and the distances to some or all of the points defined by vectors which are parallel to $e_{int}$ that intersect both the obstacle source potential curve or surface 811a and the vehicle source curve or surface 811b. At each of the intersection points on the guided vehicle source curve 811b, a weighting function is applied to average normal and average tangent vectors of the obstacle source potential curve 811a. The weighting function is based on the corresponding distance to the obstacle source potential curve 811a within the field of influence 813. Through this approach, a distributed repulsive force can be constructed along the guided vehicle source potential curve 811b. The distributed force that can be applied about a point 812 within the guided vehicle source potential curve 811b will produce a moment 817 about that point 812 through which the commands of the vehicle may be tied. In a three-dimensional case, the moments would provide the vehicle with rotational guidance commands. These rotational guidance commands can be coupled with typical translational guidance commands to provide complete 6-DOF guidance commands.

Such 6-DOF control systems can benefit systems such as a missile in an end game condition where a warhead, which has an effective direction, is used for intercept of the target.

Other potential applications include ship docking and spacecraft rendezvous and docking, which require management of thrusters to accomplish precise docking maneuvers.

Figure 20:
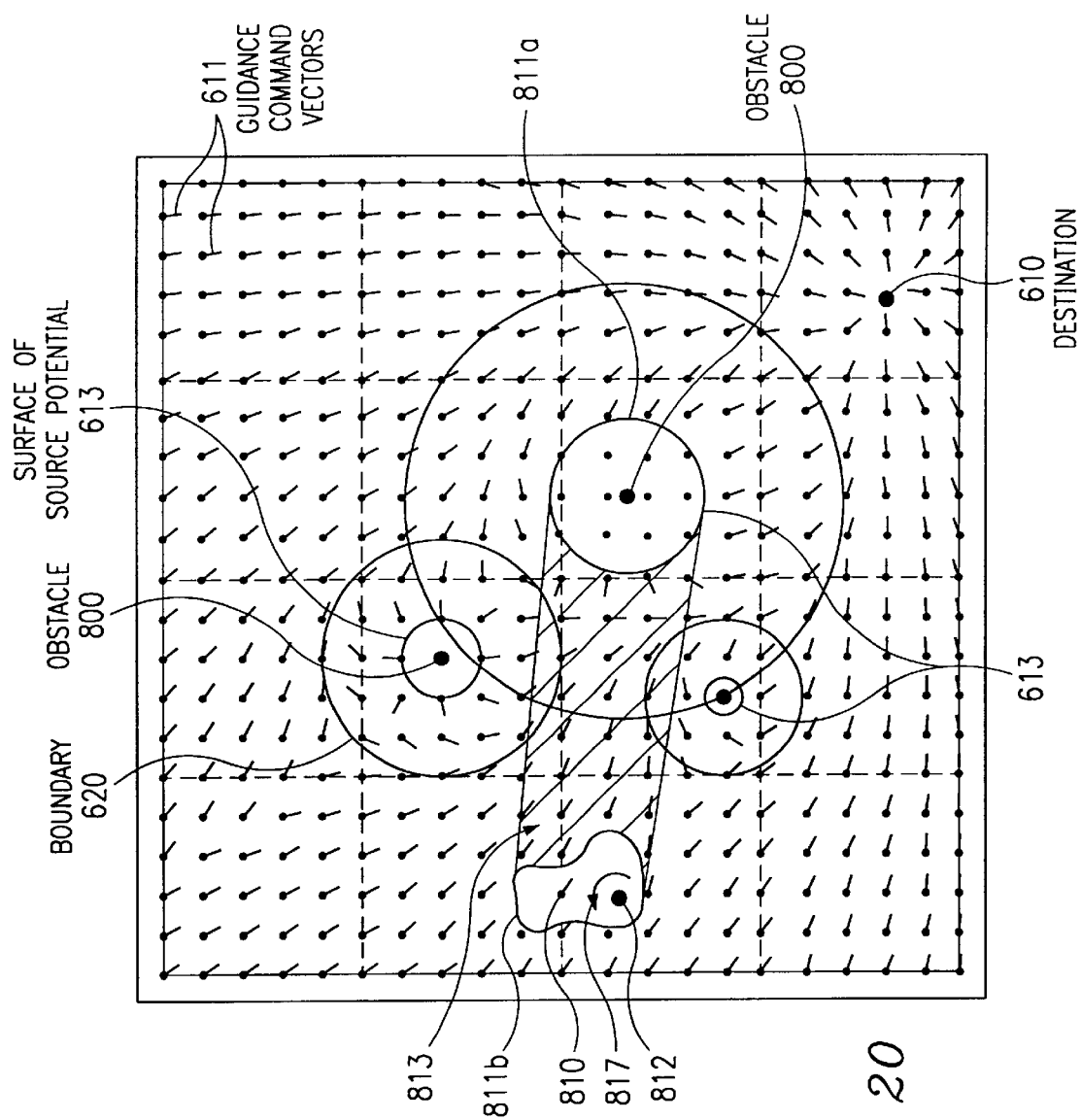
FIG. 20 is a vector field diagram illustrating an application of the present invention in a Six-Degree-of-Freedom (6DOF) vehicle control application.
Figure 21:
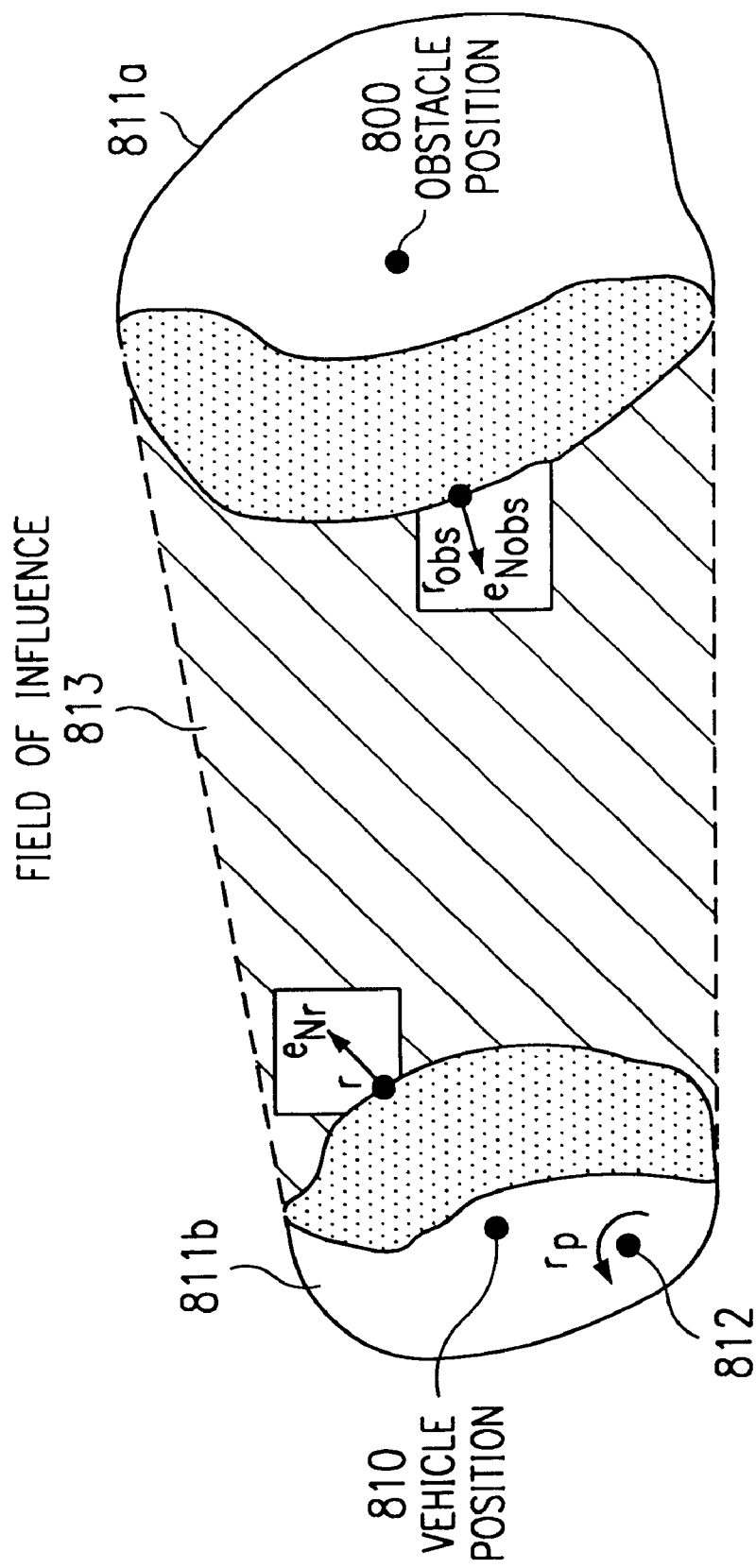
FIG. 21 shows construction of the components for the 6DOF guidance method.

FIG. 20 also illustrates the vector field as shown in FIG. 14, however, at each point the vehicle 810 now possesses an effective attitude boundary surface (shown at one location only for demonstration). The vehicle effective attitude boundary surface also has a center of rotation associated with it, which is tied to the vehicle orientation, such that:

$$e_{vehicle} = Z(x) e_{effsurface}$$

where Z(x) is a real valued constant or a continuous linear or non-linear function, and $e_{effsurface}$ is the effective attitude boundary surface of the vehicle at a single point on the vehicle and is a function of the vehicle rotation. The center of rotation is not limited to the center of gravity or to the principle axes of the vehicle.

Inclusion of vehicle attitude will increase the guidance degrees of freedom from the traditional 3-DOF to 6-DOF, with 3 translational and 3 rotational degrees of freedom. Achieving the rotational degrees of freedom requires that the vehicle 810 be affected by the avoidance algorithm. This can be achieved through construction of an apparent field between the obstacle(s) and the vehicle such that effective moments are placed on the guidance algorithm which in turn will produce a desired vehicle attitude command (function Z(x), described in a previous paragraph).

The desired attitude command may be produced by integrating a distance based function over the effective vehicle surface. Construction of the field or distance based function may be described as follows (see FIG. 21):

$$T = K(x) \int_L \int_{L'(r)} \frac{(r - r_p)(e_{Nv} * e_{Nobs})}{\|r - r_{obs}\|} dS_{obs} dSv$$

where T is the resulting attitude correction vector; K(x) is a gain scaling function to regulate the magnitude of the command; r is a local point on the vehicle 10 effective surface Sv (surface denoted by v); $r_{obs}$ is a local point on the obstacle surface; $r_p$ is the center of rotation about which the vehicle orientation will be controlled; $e_{Nv}$ is the unit vector normal to the effective surface Sv at the point r; $e_{obs}$ is the unit vector normal to the obstacle surface $S_{obs}$ at the point $r_{obs}$; L are the limits of integration which define the part of the effective surface which point in the direction of the obstacle surface $S_{obs}$ (denoted by obs); and L' (r) are the limits of integration which define the part of the obstacle surface which is visible from the current point r.

The resulting vector T will yield attitude commands about the point $r_p$. The magnitude of the commands may be modified by the gain function K(x) to yield commands which will provide a stable attitude guidance solution. The gain function K(x) may also be a spatially based function, a time based function, or a function of spatial rates (velocity, acceleration, etc), whereby function K(x) changes magnitude based on a given state. Variation of guidance gain magnitude is typical for guidance implementations of this type.

There are various ways to implement the function described above. The Fourth Embodiment described here addresses the use of the boundary representations to control more degrees-of-freedom than in typical prior art methods.

In addition to providing a means for 6-DOF guidance solutions, the Fourth Embodiment can be expanded beyond the six degrees-of-freedom guidance to include N degrees of guidance by surrounding points or surfaces of interest with boundaries, and by then applying the avoidance methods described in the First and Second Embodiments along with the method of the Fourth Embodiment.

While the various embodiments of the present invention have thus far been described as a vehicle control or guidance system, it will be appreciated by those of skill in the art that the method of the present invention can be implemented in hardware and/or software as part or all of a vehicle guidance control system.

Guidance Control Systems Implementing the Spatial Avoidance Method

Figure 22:
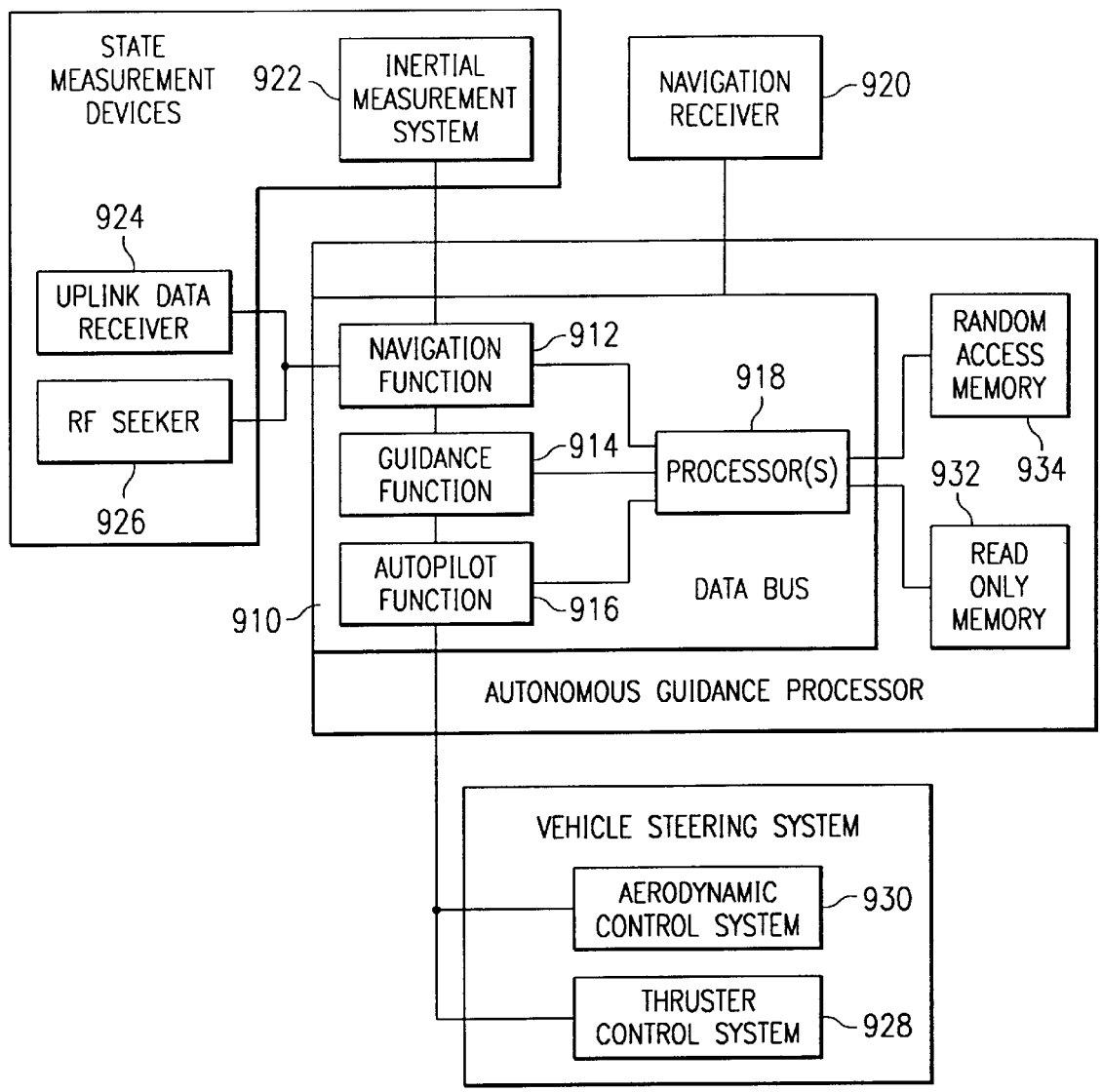
FIG. 22 is a block diagram of an autonomous vehicle guidance processing unit.
Figure 23:
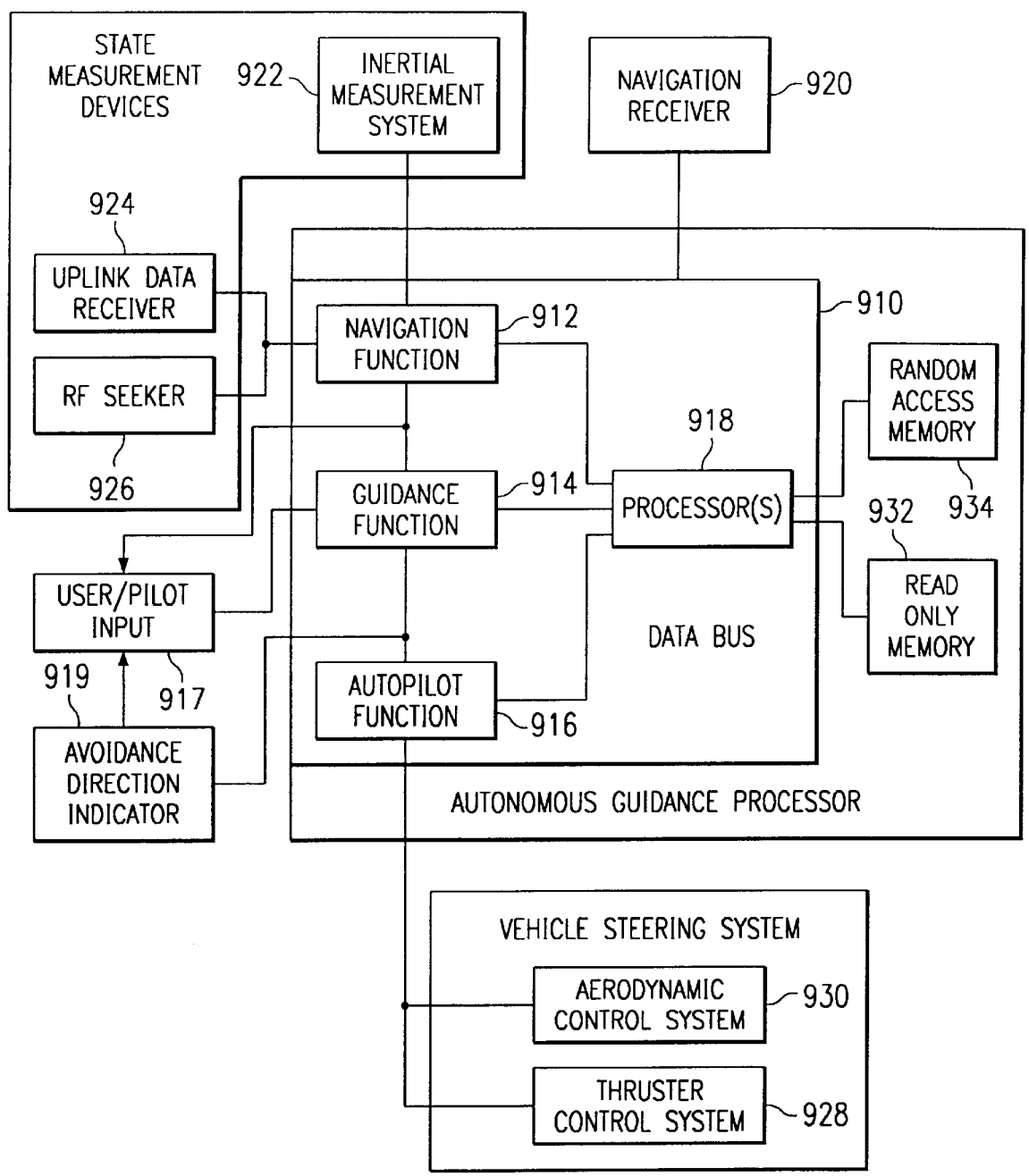
FIG. 23 is a block diagram of an automatic guidance processing unit for a piloted vehicle.
Figure 24:
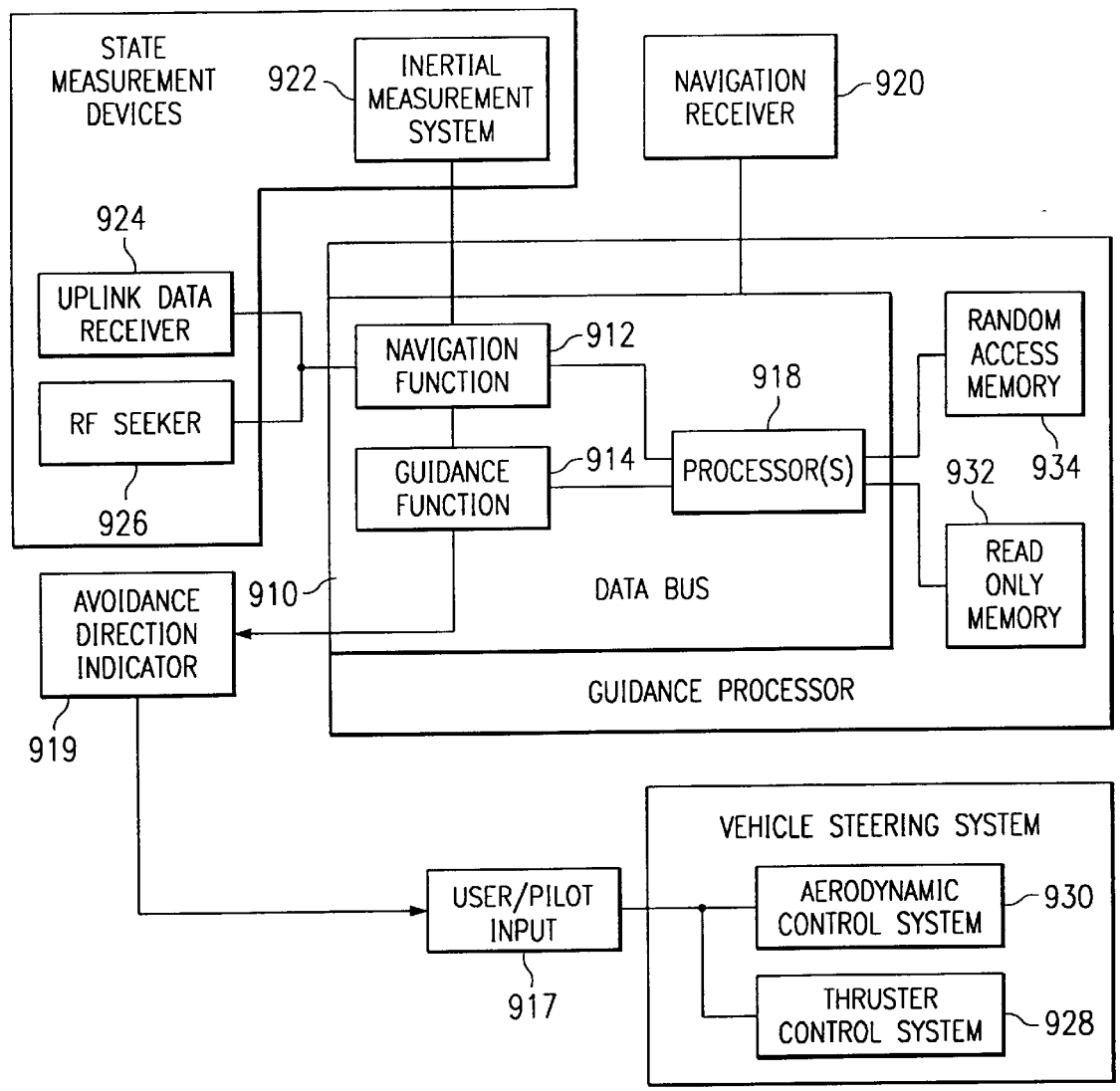
FIG. 24 is a block diagram of a pilot controlled guidance processing unit for a piloted vehicle.

Examples of vehicle guidance control systems implementing the above described spatial avoidance method are illustrated in FIGS. 22–24.

Autonomous Vehicle Guidance Processor

FIG. 22 is an example of a configuration for a guidance processing unit 910, for an autonomous vehicle guidance processor. The processing unit 910 of FIG. 22 includes a navigation function 912 and a guidance function 914, and may also include an autopilot function 916 as well as at least one processor 918 for operation of the unit. The guidance processing unit 910 interfaces with various other components, including random access memory 934 and read only memory 932, which can store navigational information as well as vehicle control algorithms. In order to control the vehicle, the guidance processing unit 910 can receive input from various sources including an inertial measurement system 922 as well as a navigation receiver 920 which may be a global positioning receiver (GPS) or other type of receiver for providing navigation information. The guidance processing unit 910 can also be connected to an uplink data receiver 924 for receiving control commands and data communications from the ground or other vehicles and may further be connected to an onboard seeker such as a radar device, forward-looking infrared receiver (FLIR) or other type of target-locating sensor. Finally, the guidance processing unit 910 outputs commands to a vehicle attitude control system 928 and/or aerodynamic maneuvering system 930 in order to control the vehicle based on the current vehicle position and condition, the presence and location of any obstacles, and the navigation objectives to be achieved.

Piloted Vehicle Automatic Guidance Control Processor

FIG. 23 is an example of a configuration of a vehicle guidance control system implementing the above described spatial avoidance method when the vehicle is piloted but under automatic guidance control. FIG. 23 illustrates the method of the invention used in systems which are known as fly-by-wire type systems. In a fly-by-wire type system, the avoidance commands are automatically directed to the autopilot function 916 without required intervention by the pilot/user 917. The pilot/user 917 acts as an input to the guidance system and does not directly fly the aircraft. All instructions from the pilot are fed through an autopilot function to produce the correct steering commands to the vehicle. In some instances, the pilot/user may be the primary guidance processor with the spatial avoidance method intervening only when necessary. Most modern aircraft operate with a fly-by-wire control system. The method may also be implemented such that it includes a feedback mechanism 919, which will show the pilot/user the change being made by the automatic system relative to the pilot/user input.

Pilot Controlled Guidance Control Processor

FIG. 24 is an example of a configuration of a vehicle guidance control system implementing the above described spatial avoidance method when the vehicle is piloted and the pilot 917 is responsible for inputting the guidance control commands calculated by the method such as in a flight director system. In the example of FIG. 24, the pilot/user is in primary control of the system and the guidance processor implementing the method of the invention only provides feedback to the pilot/user as to how to avoid the obstacles. The feedback mechanism 919 may be through an analog or digital indicator which also may be on an instrument panel or implemented in a heads-up display. The pilot/user ultimately makes the determination whether or not to implement the guidance control commands.

It will be appreciated by those of skill in the art, that the control laws for the above described system in accordance with the present invention can be implemented in computer software and stored in a memory device. Thus, a computer program encoding instructions in accordance with the described method, as well as a computer readable memory device which stores instructions executable by a computer to perform the steps of the described method are also considered to be embodiments of the present invention.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method of maneuvering a vehicle towards a destination in the presence of at least one obstacle, comprising the steps of:

defining a geometric boundary with respect to the obstacle;

establishing a nominal guidance direction for said vehicle;

establishing a nominal obstacle avoidance direction based on said geometric boundary and a relative position of said vehicle with respect to said boundary; and determining a vehicle steering direction in accordance with a function of the form:

$$D_{STEERING} = F1 * D_{GUIDANCE} + F2 * D_{AVOIDANCE};$$

where:

$D_{GUIDANCE}$ is a vector with a direction in said nominal guidance direction;

$D_{AVOIDANCE}$ is a vector with a direction in said nominal obstacle avoidance direction;

$D_{STEERING}$ is said vehicle steering direction;

F1 is a first continuous function; and

F2 is a second continuous function.

2. A method in accordance with claim 1, wherein said nominal obstacle avoidance direction is a geometric based avoidance vector determined based on a defined geometric boundary surrounding said obstacle.

3. A method in accordance with claim 2, further comprising the step of determining a distance between said vehicle and said obstacle.

4. A method in accordance with claim 3, wherein said step of determining a vehicle steering direction is further based on said distance.

5. A method in accordance with claim 4, wherein said vehicle steering direction is further based on a distance-based field element.

6. A method in accordance with claim 4, further comprising the step of determining a range of influence of said obstacle and wherein, in the case where said vehicle is beyond the range of influence of said obstacle, said vehicle steering direction is determined without regard to the presence of said obstacle.

7. A method in accordance with claim 4, further comprising the step of determining a range of influence of said obstacle and wherein, in the case where said vehicle is within the range of influence of said obstacle, said vehicle steering direction is determined based on the presence of said obstacle.

8. A method in accordance with claim 1, further comprising the steps of:

determining whether said vehicle is outside of said geometric boundary or inside of said geometric boundary.

9. A method in accordance with claim 8, wherein, in the case that said vehicle is outside of said geometric boundary, said nominal guidance direction for said vehicle is a direction substantially towards said destination.

10. A method in accordance with claim 8, wherein, in the case that said vehicle is inside of said geometric boundary, said nominal guidance direction for said vehicle is an anti-intercept direction between said vehicle and said obstacle.

11. A method in accordance with claim 1, wherein F2 is approximately equal to 1−F1.

12. A method in accordance with claim 1, further comprising the step of steering said vehicle towards said vehicle steering direction; and wherein said nominal obstacle avoidance direction is based on a relative position of said vehicle to said obstacle, and wherein said steps of establishing a nominal guidance direction towards said destination, establishing a nominal obstacle avoidance direction based on said obstacle, determining a vehicle steering direction based on said nominal guidance direction and said obstacle avoidance direction, and steering said vehicle towards said vehicle steering direction are repeated a plurality of times as said vehicle travels.

13. A method in accordance with claim 1, wherein:

said vehicle travels towards said destination in the presence of a plurality of obstacles;

said step of defining a geometric boundary with respect to said obstacle includes defining a geometric boundary with respect to each of said plurality of obstacles;

said step of establishing a nominal obstacle avoidance direction includes establishing a nominal obstacle avoidance direction for each of said obstacles; and said step of determining a vehicle steering direction includes determining a vehicle steering direction based on said nominal guidance direction and each of said nominal obstacle avoidance directions.

14. A method in accordance with claim 1, further comprising the step of determining whether said vehicle is approaching said obstacle or whether said vehicle is receding from said obstacle.

15. A method in accordance with claim 14, wherein said step of determining a vehicle steering direction includes determining a vehicle steering direction based on a result of said step of determining whether said vehicle is approaching said obstacle or whether said vehicle is receding from said obstacle.

16. A method in accordance with claim 1, further comprising the step of outputting a steering control signal effective to steer said vehicle in accordance with said vehicle steering direction.

17. A method in accordance with claim 1, further comprising the step of displaying a steering command in accordance with said vehicle steering direction.

18. A method in accordance with claim 1, wherein said vehicle steering direction is continuous across the geometric boundary.

19. A method of maneuvering a vehicle towards a destination in the presence of at least one obstacle and a distance-based field element, comprising the steps of:

establishing a nominal guidance direction for said vehicle;

establishing a geometric boundary with respect to each of said at least one obstacle;

determining a distance between said vehicle and each of said at least one obstacle;

determining, for each of said at least one obstacle, whether said vehicle is inside of said geometric boundary or outside of said geometric boundary;

based on said step of determining, for each of said at least one obstacle, whether said vehicle is inside of said geometric boundary or outside of said geometric boundary, establishing:

in the case where said vehicle is outside of said geometric boundary, said nominal guidance direction for said vehicle is a direction substantially towards the destination, and in the case where said vehicle is inside of said geometric boundary, said nominal guidance direction for said vehicle is an anti-intercept direction between said vehicle and said at least one obstacle; and determining a vehicle steering direction based on an applicable one of said nominal guidance direction, said distance, and the distance-based field element.

20. An apparatus for maneuvering a vehicle towards a destination in the presence of at least one obstacle, comprising:

a controller having a memory;

a means for inputting a nominal guidance direction for said vehicle into said memory;

a computer for computing a nominal obstacle avoidance direction based on a geometric boundary with respect to said at least one obstacle, and for computing a vehicle steering direction in accordance with a function of the form:

$$D_{STEERING} = F1 * D_{GUIDANCE} + F2 * D_{AVOIDANCE};$$

where:

$D_{GUIDANCE}$ is a vector with a direction in said nominal guidance direction;

$D_{AVOIDANCE}$ is a vector with a direction in said nominal obstacle avoidance direction;
$D_{STEERING}$ is said vehicle steering direction;
F1 is a first continuous function; and
F2 is a second continuous function.

21. An apparatus of claim 20, further comprising:
an autopilot for receiving said vehicle steering direction and steering said vehicle toward said vehicle steering direction.

22. A method for maneuvering a first vehicle in the presence of a second vehicle, comprising the steps of:
establishing a geometric boundary with respect to the second vehicle;
establishing a nominal guidance direction for each of said first and said second vehicles;
establishing a nominal obstacle avoidance direction for said first vehicle with respect to said second vehicle;
determining a steering direction for said first vehicle in accordance with a function of the form:

$$D_{STEERING}=F1*D_{GUIDANCE}+F2*D_{AVOIDANCE};$$

where:
$D_{GUIDANCE}$ is a vector with a direction in said nominal guidance direction of said first vehicle;
$D_{AVOIDANCE}$ is a vector with a direction in said nominal obstacle avoidance direction;
$D_{STEERING}$ is said vehicle steering direction;
F1 is a first continuous function; and
F2 is a second continuous function.

23. A method for maneuvering a first vehicle in relation to a second vehicle, comprising the steps of:
establishing a first repulsive boundary around said second vehicle;
establishing a first attractive boundary around said first repulsive boundary, said first repulsive boundary and said first attractive boundary defining an interactive region therebetween;
computing a steering direction for said first vehicle such that
when said first vehicle is outside said first attractive boundary, said first vehicle is directed toward said second vehicle,
when said first vehicle is within said first repulsive boundary, said first vehicle is directed away from said second vehicle, and
when said first vehicle is within said interactive region, said first vehicle is directed either toward or away from said second vehicle based on a weighted function.

24. A guidance processor for maneuvering a vehicle towards a destination in the presence of at least one obstacle, said obstacle having a geometric boundary defined with respect thereto, comprising:
a device for determining a nominal guidance direction for said vehicle;
a device for determining a nominal obstacle avoidance direction based on said geometric boundary and a relative position of said vehicle with respect to said geometric boundary; and;
a device for determining a vehicle steering direction in accordance with a function of the form:

$$D_{STEERING}=F1*D_{GUIDANCE}+F2*D_{AVOIDANCE};$$

where:
$D_{GUIDANCE}$ is a vector with a direction in said nominal guidance direction;
$D_{AVOIDANCE}$ is a vector with a direction in said nominal obstacle avoidance direction;
$D_{STEERING}$ is said vehicle steering direction;
F1 is a first continuous function; and
F2 is a second continuous function.

25. A guidance processor in accordance with claim 24, wherein said nominal obstacle avoidance direction is a geometric based avoidance vector determined based on a defined geometric boundary surrounding said obstacle.

26. A guidance processor in accordance with claim 24, further comprising:
a device for determining whether said vehicle is outside of said geometric boundary or inside of said geometric boundary.

27. A guidance processor in accordance with claim 26, wherein, in the case that said vehicle is outside of said geometric boundary, said nominal guidance direction for said vehicle is a direction substantially towards said destination.

28. A guidance processor in accordance with claim 26, wherein, in the case that said vehicle is inside of said geometric boundary, said nominal guidance direction for said vehicle is an anti-intercept direction between said vehicle and said obstacle.

29. A guidance processor in accordance with claim 24, further comprising:
a device for determining a distance between said vehicle and said at least one obstacle.

30. A guidance processor in accordance with claim 29, wherein said device for determining a vehicle steering direction further determines said vehicle steering direction based on said distance.

31. A guidance processor in accordance with claim 30, further comprising:
a device for determining a range of influence of said obstacle and wherein, in the case where said vehicle is beyond the range of influence of said obstacle, said device for determining a vehicle steering direction further determines said vehicle steering direction without regard to the presence of said obstacle.

32. A guidance processor in accordance with claim 30, further comprising:
a device for determining a range of influence of said obstacle and wherein, in the case where said vehicle is within the range of influence of said obstacle, said device for determining a vehicle steering direction further determines said vehicle steering direction based on the presence of said obstacle.

33. A guidance processor in accordance with claim 24, wherein said device for determining a vehicle steering direction further determines said vehicle steering direction based on a distance-based field element.

34. A guidance processor in accordance with claim 24, wherein said device for determining a vehicle steering direction determines said steering direction by blending together said nominal guidance direction and said nominal obstacle avoidance direction based on a blending ratio.

35. A guidance processor in accordance with claim 24, wherein F2 is approximately equal to 1−F1.

36. A guidance processor in accordance with claim 24, further comprising:
a device for steering said vehicle towards said vehicle steering direction; and wherein said device for determining a nominal guidance direction for said vehicle determines said nominal obstacle avoidance direction based on a relative position of said vehicle to said obstacle, and wherein said device for determining a nominal guidance direction for said vehicle, said device for determining a nominal obstacle avoidance direction based on said obstacle, and said device for determining a vehicle steering direction each continually update its corresponding direction as said vehicle travels.

37. A guidance processor in accordance with claim 24, wherein:

said vehicle travels towards said destination in the presence of a plurality of obstacles;

wherein said device for determining a nominal obstacle avoidance direction determines a nominal obstacle avoidance direction for each of said obstacles; and wherein said device for determining a vehicle steering direction determines a vehicle steering direction based on said nominal guidance direction and each of said nominal obstacle avoidance directions.

38. A guidance processor in accordance with claim 24, further comprising:

a device for determining whether said vehicle is approaching said obstacle or whether said vehicle is receding from said obstacle.

39. A guidance processor in accordance with claim 38, wherein said device for determining a vehicle steering direction determines said vehicle steering direction based on an output from said device for determining whether said vehicle is approaching said obstacle or whether said vehicle is receding from said obstacle.

40. A guidance processor in accordance with claim 24, further comprising:

a device for outputting a steering control signal to steer said vehicle in accordance with said vehicle steering direction.

41. A guidance processor in accordance with claim 24, further comprising:

a device for displaying a steering command in accordance with said vehicle steering direction.

42. A memory device for use with a guidance processor for maneuvering a vehicle towards a destination in the presence of at least one obstacle, said memory device comprising encoded instructions executable by the guidance processor for:

establishing a geometric boundary with respect to each of the at least one obstacle;

establishing a nominal guidance direction for said vehicle;

establishing a nominal obstacle avoidance direction based on said geometric boundary and a relative position of said vehicle with respect to said geometric boundary; and determining a vehicle steering direction in accordance with a function of the form:

$$D_{STEERING}=F1*D_{GUIDANCE}+F2*D_{AVOIDANCE};$$

where:

$D_{GUIDANCE}$ is a vector with a direction in said nominal guidance direction;

$D_{AVOIDANCE}$ is a vector with a direction in said nominal obstacle avoidance direction;

$D_{STEERING}$ is said vehicle steering direction;

F1 is a first continuous function; and

F2 is a second continuous function.

43. A memory device in accordance with claim 42, wherein said nominal obstacle avoidance direction is a geometric based avoidance vector determined based on a defined geometric boundary surrounding said obstacle.

44. A memory device in accordance with claim 43, further comprising encoded instructions executable by the guidance processor for:

receiving information indicative of a distance between said vehicle and said obstacle.

45. A memory device in accordance with claim 44, wherein said encoded instructions for determining a vehicle steering direction further determine said steering direction based on said distance.

46. A memory device in accordance with claim 45, wherein said encoded instructions for determining a vehicle steering direction further determine said vehicle steering direction based on a distance-based field element.

47. A memory device in accordance with claim 45, further comprising encoded instructions executable by the guidance processor for:

determining a range of influence of said obstacle; and wherein, in the case where said vehicle is beyond the range of influence of said obstacle, said encoded instructions for determining a vehicle steering direction further determine said vehicle steering direction without regard to the presence of said obstacle.

48. A memory device in accordance with claim 45, further comprising encoded instructions executable by the guidance processor for:

determining a range of influence of said obstacle and wherein, in the case where said vehicle is within the range of influence of said obstacle, said encoded instructions for determining a vehicle steering direction further determine said vehicle steering direction based on the presence of said obstacle.

49. A memory device in accordance with claim 42, further comprising encoded instructions executable by the autopilot controller for:

determining whether said vehicle is outside of said geometric boundary or inside of said geometric boundary.

50. A memory device in accordance with claim 49, wherein, in the case that said vehicle is outside of said geometric boundary, said nominal guidance direction for said vehicle is a direction substantially towards said destination.

51. A memory device in accordance with claim 49, wherein, in the case that said vehicle is inside of said geometric boundary, said nominal guidance direction for said vehicle is an anti-intercept direction between said vehicle and said obstacle.

52. A memory device in accordance with claim 42, wherein F2 is approximately equal to 1−F1.

53. A memory device in accordance with claim 42, further comprising encoded instructions executable by the guidance processor for:

outputting a steering signal for steering said vehicle towards said steering direction; and wherein said encoded instructions for determining a nominal obstacle avoidance direction determine said nominal obstacle avoidance direction based on a relative position of said vehicle to said obstacle, and wherein said memory further comprises encoded instructions to execute said instructions for establishing a nominal guidance direction towards said destination, establishing a nominal obstacle avoidance direction based on said obstacle, determining a vehicle steering direction based on said nominal guidance direction and said obstacle avoidance direction, and outputting a steering signal for steering said vehicle towards said vehicle steering direction a plurality of times as said vehicle travels.

54. A memory device in accordance with claim 42, wherein:
said vehicle travels towards said destination in the presence of a plurality of obstacles;
said encoded instructions for establishing a nominal obstacle avoidance direction include encoded instructions for establishing a nominal obstacle avoidance direction for each of said obstacles; and
said encoded instructions for determining a vehicle steering direction includes encoded instructions for determining a vehicle steering direction based on said nominal guidance direction and each of said nominal obstacle avoidance directions.

55. A memory device in accordance with claim 42, further comprising encoded instructions executable by the guidance processor for:
determining whether said vehicle is approaching said obstacle or whether said vehicle is receding from said obstacle.

56. A memory device in accordance with claim 55, wherein said encoded instructions for determining a vehicle steering direction includes encoded instructions for determining a vehicle steering direction based on an output of said encoded instructions for determining whether said vehicle is approaching said obstacle or whether said vehicle is receding from said obstacle.

57. A memory device in accordance with claim 42, further comprising encoded instructions executable by the guidance processor for:
outputting a steering control signal effective to steer said vehicle in accordance with said vehicle steering direction.

58. A memory device in accordance with claim 42, further comprising encoded instructions executable by the guidance processor for:
outputting a steering display command in accordance with said vehicle steering direction for indicating a direction for steering said vehicle.

59. Computer executable software for use with a guidance processor for maneuvering a vehicle towards a destination in the presence of at least one obstacle, said obstacle having a geometric boundary defined with respect thereto, comprising:
means for determining a nominal guidance direction for said vehicle;
means for determining a nominal obstacle avoidance direction based on said geometric boundary and a relative position of said vehicle with respect to said geometric boundary; and
means for determining a vehicle steering direction in accordance with a function of the form:

$$D_{STEERING}=F1*D_{GUIDANCE}+F2*D_{AVOIDANCE};$$

where:
$D_{GUIDANCE}$ is a vector with a direction in said nominal guidance direction;
$D_{AVOIDANCE}$ is a vector with a direction in said nominal obstacle avoidance direction;
$D_{STEERING}$ is said vehicle steering direction;
F1 is a first continuous function; and
F2 is a second continuous function.

60. An autopilot controller for maneuvering a vehicle towards a destination in the presence of at least one obstacle, said obstacle having a geometric boundary defined with respect thereto, comprising:
a device for determining a nominal guidance direction for said vehicle;
a device for determining a nominal obstacle avoidance direction based on said geometric boundary and a relative position of said vehicle with respect to said geometric boundary; and
a device for determining a vehicle steering direction in accordance with a function of the form:

$$D_{STEERING}=F1*D_{GUIDANCE}+F2*D_{AVOIDANCE};$$

where:
$D_{GUIDANCE}$ is a vector with a direction in said nominal guidance direction;
$D_{AVOIDANCE}$ is a vector with a direction in said nominal obstacle avoidance direction;
$D_{STEERING}$ is said vehicle steering direction;
F1 is a first continuous function; and
F2 is a second continuous function.

61. An autopilot controller in accordance with claim 60, wherein said nominal obstacle avoidance direction is a geometric based avoidance vector determined based on a defined geometric boundary surrounding said obstacle.

62. An autopilot controller in accordance with claim 61, wherein F2 is approximately equal to 1−F1.

63. An autopilot controller in accordance with claim 61, further comprising:
a device for steering said vehicle towards said vehicle steering direction; and
wherein said device for determining a nominal guidance direction for said vehicle determines said nominal obstacle avoidance direction based on a relative position of said vehicle to said obstacle, and wherein device for determining a nominal guidance direction for said vehicle, said device for determining a nominal obstacle avoidance direction based on said obstacle, and said device for determining a vehicle steering direction each continually updates its corresponding direction as said vehicle travels.

64. A method of maneuvering a vehicle towards a destination in the presence of at least one operational boundary, comprising the steps of:
defining a geometric boundary with respect to the operational boundary;
establishing a nominal guidance direction for said vehicle;
establishing a nominal obstacle avoidance direction based on said geometric boundary and a relative position of said vehicle with respect to said boundary; and;
determining a vehicle steering direction in accordance with a function of the form:

$$D_{STEERING}=F1*D_{GUIDANCE}+F2*D_{AVOIDANCE};$$

where:
$D_{GUIDANCE}$ is a vector with a direction in said nominal guidance direction;
$D_{AVOIDANCE}$ is a vector with a direction in said nominal obstacle avoidance direction;
$D_{STEERING}$ is said vehicle steering direction;
F1 is a first continuous function; and
F2 is a second continuous function.

65. A method in accordance with claim 64, wherein the operational boundary is selected from the group consisting of a maximum altitude, a minimum altitude, and a maximum submersion depth.

* * * * *